United States Patent
Masuzawa et al.

(10) Patent No.: US 9,203,280 B2
(45) Date of Patent: Dec. 1, 2015

(54) MAGNETIC LEVITATION CONTROL DEVICE AND HYBRID TYPE MAGNETIC BEARING

(75) Inventors: Toru Masuzawa, Hitachi (JP); Eisuke Sasaki, Hitachi (JP)

(73) Assignee: IBARAKI UNIVERSITY, Ibaraki (JP)

( * ) Notice: Subject to any disclaimer, the term of this patent is extended or adjusted under 35 U.S.C. 154(b) by 411 days.

(21) Appl. No.: 13/383,842

(22) PCT Filed: Jul. 12, 2010

(86) PCT No.: PCT/JP2010/004512
§ 371 (c)(1),
(2), (4) Date: Jan. 13, 2012

(87) PCT Pub. No.: WO2011/007544
PCT Pub. Date: Jan. 20, 2011

(65) Prior Publication Data
US 2012/0139375 A1 Jun. 7, 2012

(30) Foreign Application Priority Data

Jul. 16, 2009 (JP) .................... 2009-167937

(51) Int. Cl.
*H02K 1/27* (2006.01)
*H02K 7/09* (2006.01)
*F16C 32/04* (2006.01)

(52) U.S. Cl.
CPC .............. *H02K 7/09* (2013.01); *F16C 32/0465* (2013.01); *H02K 1/2766* (2013.01); *F16C 32/0468* (2013.01); *F16C 32/0474* (2013.01); *H02K 1/27* (2013.01)

(58) Field of Classification Search
CPC ......... H02K 1/27; H02K 1/2766; H02K 7/09; F16C 32/0456; F16C 32/0468; F16C 32/0474

USPC ................ 310/90.5, 156.07, 156.38, 156.49, 310/156.82, 156.84, 181, 156.53, 156.56
IPC ................................. H02K 1/27,7/09
See application file for complete search history.

(56) References Cited

U.S. PATENT DOCUMENTS 3,324,254 A * 6/1967 Shaw ................... H04R 1/08
248/121
3,885,504 A * 5/1975 Baermann ............ B60L 13/04
104/283

(Continued)

FOREIGN PATENT DOCUMENTS

JP 2003-21140 A 1/2003
JP 2003-87909 A 3/2003

(Continued)

OTHER PUBLICATIONS

International Search Report issued in PCT/JP2010/004512, dated Oct. 12, 2010.

*Primary Examiner* — John K Kim
(74) *Attorney, Agent, or Firm* — Birch, Stewart, Kolasch & Birch, LLP

(57) ABSTRACT

A bias magnetic flux is formed so as to be passed through the electromagnet core of an electromagnet, and a bypass magnetic path, serving as a magnetic path for a control magnetic flux, is formed in parallel with a permanent magnet, the bypass magnetic path being magnetized in a direction in which passage of the bias magnetic flux is blocked, and thus, even if the permanent magnet and the electromagnet are disposed in locations where the mutual magnetic fluxes of the permanent magnet and the electromagnet are superimposed, the control magnetic flux formed by the electromagnet is passed through the bypass magnetic path, whereby loss of the control magnetic flux can be suppressed. Thereby, the permanent magnet and the electromagnet can be disposed in locations where the mutual magnetic fluxes are superimposed, whereby the device can be made smaller in size.

6 Claims, 18 Drawing Sheets

(56) References Cited

U.S. PATENT DOCUMENTS

| | | | | |
|---|---|---|---|---|
| 4,308,479 | A * | 12/1981 | Richter | H02K 1/2706 310/156.07 |
| 5,013,951 | A * | 5/1991 | Stadnik et al. | 310/156.07 |
| 6,885,121 | B2 * | 4/2005 | Okada | F16C 32/0444 310/181 |
| 6,943,464 | B2 * | 9/2005 | Hol | G03F 7/70758 310/12.05 |
| 7,683,514 | B2 * | 3/2010 | Onuma | F16C 32/0465 310/181 |
| 8,378,543 | B2 * | 2/2013 | Filatov | H02K 7/09 310/90.5 |
| 2001/0030471 | A1 * | 10/2001 | Kanebako | F16C 32/0465 310/90.5 |
| 2002/0175578 | A1 * | 11/2002 | McMullen et al. | 310/90.5 |
| 2004/0150278 | A1 * | 8/2004 | Okada et al. | 310/90.5 |
| 2006/0103249 | A1 * | 5/2006 | Miya et al. | 310/90.5 |
| 2008/0309171 | A1 * | 12/2008 | Sadarangani | 310/15 |
| 2009/0121571 | A1 * | 5/2009 | Onuma | F04D 29/058 310/90.5 |
| 2009/0315421 | A1 | 12/2009 | Onuma et al. | |
| 2011/0101905 | A1 * | 5/2011 | Filatov | 318/495 |
| 2012/0139375 | A1 * | 6/2012 | Masuzawa et al. | 310/90.5 |

FOREIGN PATENT DOCUMENTS

| | | |
|---|---|---|
| JP | 2005-121157 A | 5/2005 |
| JP | 2007-9949 A | 1/2007 |
| JP | 2007-120635 A | 5/2007 |

* cited by examiner

MAGNETIC LEVITATION CONTROL DEVICE AND HYBRID TYPE MAGNETIC BEARING

TECHNICAL FIELD

The present invention relates to a magnetic levitation control device and a hybrid type magnetic bearing for controlling the position of an object to be levitated by using a permanent magnet in conjunction with an electromagnet.

BACKGROUND ART

As a conventional hybrid type magnetic bearing which uses a permanent magnet in conjunction with an electromagnet, a hybrid type magnetic bearing which is supported in a non-contact state by controlling the magnetic forces of plural electromagnets and permanent magnets, having a rotating rotor (Patent Document 1), and a magnetic bearing for use with an artificial heart (Patent Document 2), are known, and the art available for obtaining the magnetic flux necessary for controlling a magnetic bearing by superimposing a bias magnetic flux generated by a permanent magnet over an electromagnet magnetic flux generated by an electromagnet is known from the aforementioned Patent Document 1.

CITATION LIST

Patent Documents

Patent Document 1
  Japanese Unexamined Patent Application Publication No. 2007-120635
Patent Document 2
  Japanese Unexamined Patent Application Publication No. 2005-121157

DISCLOSURE OF THE INVENTION

Problems to be Solved by the Invention

However, the hybrid type magnetic bearing as disclosed in Patent Document 1 presents a problem that, because a magnetic path is three-dimensionally configured by an electromagnet magnetic flux generated by an electromagnet and a bias magnetic flux generated by a permanent magnet, the leakage loss of each magnetic flux is great, thereby making it impossible to enhance the efficiency. In addition, there is presented another problem that the structure is complicated, which results in difficulty of the manufacture.

As a solution means for reducing the leakage loss of a magnetic flux, and facilitating the manufacture of a hybrid type magnetic bearing, it may be considered to configure the magnetic path two-dimensionally. However, if the magnetic path is two-dimensionally configured, as with the magnetic bearing as disclosed in Patent Document 2, the magnetic flux formed by the electromagnet and the bias magnetic flux generated by the permanent magnet both form a magnetic path passing through the same permanent magnet, thereby the magnetic flux formed by the electromagnet is weakened by a large magnetic reluctance of the permanent magnet, which makes it difficult to obtain a great magnetic flux required for movement-control of the magnetic bearing.

In view of the above-mentioned problems, the present invention has been made to provide a magnetic levitation control device and a hybrid type magnetic bearing wherein, even if the permanent magnet and the electromagnet are disposed in locations where the respective magnetic fluxes are superimposed over each other, the influence of the magnetic reluctance of the permanent magnet for generating a bias magnetic flux on the control magnetic flux formed by the electromagnet is reduced, thereby the loss of the control magnetic flux formed by the electromagnet being suppressed, whereby a greater magnetic flux for carrying out position control of the object to be magnetically levitated can be obtained.

Means for Solving the Problems

According to an aspect of the present invention, there is provided a magnetic levitation control device for controlling the position of an object to be magnetically levitated with respect to an electromagnet by means of a bias magnetic flux formed by a biasing permanent magnet and a control magnetic flux formed by an electromagnet, the magnetic levitation control device comprising: the bias magnetic flux being formed so as to be passed through the electromagnet core of the electromagnet; a bypass magnetic path, serving as a magnetic path for the control magnetic flux, being formed in parallel with the biasing permanent magnet; and the bypass magnetic path being magnetized in a direction in which passage of the bias magnetic flux is blocked.

According to another aspect of the present invention, there is provided a magnetic levitation control device, wherein the bypass magnetic path is constituted by a permanent magnet and a magnetic substance, the magnetic flux formed by the permanent magnet of the bypass magnetic path functioning as the bias magnetic flux.

According to another aspect of the present invention, there is provided a magnetic levitation control device, wherein the biasing permanent magnet and the bypass magnetic path are provided in the object to be magnetically levitated.

According to another aspect of the present invention, there is provided a magnetic levitation control device, wherein the electromagnet is disposed such that the two salient poles thereof, i.e., the magnetic poles thereof face the object to be magnetically levitated; the biasing permanent magnet is disposed such that the magnetic poles thereof are arranged parallel to the face of the object to be magnetically levitated that is opposite to the electromagnet; and the permanent magnet of the bypass magnetic path is disposed such that the magnetic poles thereof are arranged perpendicularly to the face of the object to be magnetically levitated that is opposite to the electromagnet.

According to another aspect of the present invention, there is provided a magnetic levitation control device, wherein, as the permanent magnet of the bypass magnetic path, two permanent magnets are provided, facing the two salient poles of the electromagnet, respectively, and the magnetic force of the two permanent magnets is set such that the magnetic flux densities in the respective gaps between the respective two salient poles of the electromagnet and the object to be magnetically levitated are equal to each other.

According to another aspect of the present invention, there is provided a magnetic levitation control device, wherein the biasing permanent magnet and the bypass magnetic path are provided in the electromagnet.

According to another aspect of the present invention, there is provided a hybrid type magnetic bearing for controlling the position of a magnetically levitated rotor with respect to an electromagnet by means of a bias magnetic flux formed by a biasing permanent magnet and a control magnetic flux formed by an electromagnet, the hybrid type magnetic bearing comprising: the bias magnetic flux being formed so as to be passed through the electromagnet core of the electromagnet; a bypass magnetic path, serving as a magnetic path for the control magnetic flux, being formed in parallel with the biasing permanent magnet; and the bypass magnetic path being magnetized in a direction in which passage of the bias magnetic flux is blocked.

According to another aspect of the present invention, there is provided a hybrid type magnetic bearing, wherein the bypass magnetic path is constituted by a permanent magnet and a magnetic substance, the magnetic flux formed by the permanent magnet of the bypass magnetic path functioning as the bias magnetic flux.

According to another aspect of the present invention, there is provided a hybrid type magnetic bearing, wherein the biasing permanent magnet which is concentrically disposed, being magnetized in the radial direction, and the bypass magnetic path connecting between the respective magnetic poles of the biasing permanent magnet are provided in the magnetically levitated rotor; and the electromagnet is disposed such that the two salient poles thereof, i.e., the magnetic poles thereof face the magnetically levitated rotor from the axial direction, the electromagnet controlling the axial position of the magnetically levitated rotor.

According to another aspect of the present invention, there is provided a hybrid type magnetic bearing, wherein, as the permanent magnet of the bypass magnetic path, a permanent magnet is provided which is concentrically disposed, being magnetized in the axial direction of the magnetically levitated rotor.

According to another aspect of the present invention, there is provided a hybrid type magnetic bearing, wherein, as the permanent magnet of the bypass magnetic path, two permanent magnets are provided, facing the two salient poles of the electromagnet, respectively, and the magnetic force of the two permanent magnets is set such that the magnetic flux densities in the respective gaps between the respective two salient poles of the electromagnet and the object to be magnetically levitated are equal to each other.

According to another aspect of the present invention, there is provided a hybrid type magnetic bearing, wherein the biasing permanent magnet and the bypass magnetic path are provided in the electromagnet.

According to another aspect of the present invention, there is provided a hybrid type magnetic bearing, wherein the biasing permanent magnet, being cylinder-shaped and magnetized in the axial direction, and the bypass magnetic path connecting between the respective magnetic poles of the biasing permanent magnet are provided in the magnetically levitated rotor; and the electromagnet is disposed such that the two salient poles thereof, i.e., the magnetic poles thereof face the magnetically levitated rotor from the radial direction, the electromagnet controlling the position of the magnetically levitated rotor in the radial direction.

Advantages of the Invention

As described above, in the magnetic levitation control device according to one aspect of the present invention, a bias magnetic flux is formed so as to be passed through the electromagnet core of an electromagnet; a bypass magnetic path, serving as a magnetic path for a control magnetic flux, is formed in parallel with a biasing permanent magnet; and the bypass magnetic path is magnetized in a direction in which passage of the bias magnetic flux is blocked, thereby, even if the permanent magnet and the electromagnet are disposed in locations where the mutual magnetic fluxes of the permanent magnet and the electromagnet are superimposed, the control magnetic flux formed by the electromagnet is passed through the bypass magnetic path, whereby the influence of the magnetic reluctance of the biasing permanent magnet for generating a bias magnetic flux can be reduced; loss of the control magnetic flux formed by the electromagnet can be suppressed; and a greater magnetic flux for performing position control of the object to be magnetically levitated can be obtained. Thereby, the biasing permanent magnet and the electromagnet can be disposed in locations where the mutual magnetic fluxes are superimposed, whereby the device can be made smaller in size.

Further, in the magnetic levitation control device according to another aspect of the present invention, the bypass magnetic path is constituted by a permanent magnet and a magnetic substance, whereby the magnetic flux formed by the permanent magnet of the bypass magnetic path can function as a bias magnetic flux, and thereby the force of magnetic attraction can be efficiently improved.

Further, in the magnetic levitation control device according to another aspect of the present invention, the biasing permanent magnet and the bypass magnetic path are provided in the object to be magnetically levitated, whereby the structure of the electromagnet forming a control magnetic flux can be simplified, and thereby maintenance of the electromagnet can be made with ease.

Further, in the magnetic levitation control device according to another aspect of the present invention, as the magnetic poles of the electromagnet, two salient poles are disposed so as to face the object to be magnetically levitated; the biasing permanent magnet is disposed such that the magnetic poles thereof are arranged parallel to the face of the object to be magnetically levitated that is opposite to the electromagnet; the permanent magnet of the bypass magnetic path is disposed such that the magnetic poles are arranged perpendicularly to the face of the object to be magnetically levitated that is opposite to the electromagnet, whereby, for the permanent magnet of the bypass magnetic path, a sufficient cross-sectional area can be easily secured, and thereby the magnetic reluctance of the bypass magnetic path can be efficiently reduced, thus the magnetic reluctance of the whole including the biasing permanent magnet can be reduced.

Further, in the magnetic levitation control device according to another aspect of the present invention, as the permanent magnet of the bypass magnetic path, two permanent magnets are disposed so as to face the two salient poles of the electromagnet, respectively, and the magnetic force of the two permanent magnets is set such that the magnetic flux densities in the respective gaps between the respective two salient poles of the electromagnet and the object to be magnetically levitated are equal to each other, whereby the two salient poles of the electromagnet can exert the force of magnetic attraction under uniform conditions.

Further, in the magnetic levitation control device according to another aspect of the present invention, the biasing permanent magnet and the bypass magnetic path are provided in the electromagnet, whereby the structure of the object to be magnetically levitated can be simplified to be light-weighted, thereby allowing levitation control with ease.

Further, in the hybrid type magnetic bearing according to another aspect of the present invention, a bias magnetic flux is formed so as to be passed through the electromagnet core of an electromagnet; a bypass magnetic path, serving as a magnetic path for a control magnetic flux, is formed in parallel with a biasing permanent magnet; and the bypass magnetic path is magnetized in a direction in which passage of the bias magnetic flux is blocked, thereby, even if the permanent magnet and the electromagnet are disposed in locations where the mutual magnetic fluxes of the permanent magnet and the electromagnet are superimposed, the control magnetic flux formed by the electromagnet is passed through the by pass magnetic path, whereby the influence of the magnetic reluctance of the biasing permanent magnet for generating a bias magnetic flux can be reduced; loss of the control magnetic flux formed by the electromagnet can be suppressed; and a greater magnetic flux for performing position control of the object to be magnetically levitated can be obtained. Thereby, the biasing permanent magnet and the electromagnet can be disposed in locations where the mutual magnetic fluxes are superimposed, whereby the device can be made smaller in size.

Further, in the hybrid type magnetic bearing according to another aspect of the present invention, the bypass magnetic path is constituted by a permanent magnet and a magnetic substance, whereby the magnetic flux formed by the permanent magnet of the bypass magnetic path can function as a bias magnetic flux, thereby the force of magnetic attraction can be efficiently improved.

Further, in the hybrid type magnetic bearing according to another aspect of the present invention, the biasing permanent magnet which is concentrically disposed, being magnetized in the radial direction, and the bypass magnetic path connecting between the respective magnetic poles of the biasing permanent magnet are provided in the magnetically levitated rotor; and the electromagnet is disposed such that the two salient poles thereof, i.e., the magnetic poles thereof face the magnetically levitated rotor from the axial direction, the electromagnet controlling the axial position of the magnetically levitated rotor, thereby the magnetic flux passing through the electromagnet core of the electromagnet will not be changed by the rotation of the magnetically levitated rotor, whereby core loss, such as eddy-current loss, can be made lower, and the need for disposing the electromagnet in the radial direction of the magnetically levitated rotor is eliminated, whereby a slim device can be realized.

Further, in the hybrid type magnetic bearing according to another aspect of the present invention, as the permanent magnet of the bypass magnetic path, a permanent magnet is provided which is concentrically disposed, being magnetized in the axial direction of the magnetically levitated rotor, whereby, for the permanent magnet of the bypass magnetic path, a sufficient cross-sectional area can be easily secured, thereby the magnetic reluctance of the bypass magnetic path can be efficiently reduced, thus the magnetic reluctance of the whole including the biasing permanent magnet can be reduced.

Further, in the hybrid type magnetic bearing according to another aspect of the present invention, as the permanent magnet of the bypass magnetic path, two permanent magnets are disposed so as to face the two salient poles of the electromagnet, respectively, and the magnetic force of the two permanent magnets is set such that the magnetic flux densities in the respective gaps between the respective two salient poles of the electromagnet and the object to be magnetically levitated are equal to each other, whereby the two salient poles of the electromagnet can exert the force of magnetic attraction under uniform conditions.

Further, in the hybrid type magnetic bearing according to another aspect of the present invention, the biasing permanent magnet and the bypass magnetic path are provided in the electromagnet, whereby the structure of the object to be magnetically levitated can be simplified to be light-weighted, thereby allowing levitation control with ease.

Further, in the hybrid type magnetic bearing according to another aspect of the present invention, the biasing permanent magnet, being cylinder-shaped and magnetized in the axial direction, and the bypass magnetic path connecting between the respective magnetic poles of the biasing permanent magnet are provided in the magnetically levitated rotor; and the electromagnet is disposed such that the two salient poles thereof, i.e., the magnetic poles thereof face the magnetically levitated rotor from the radial direction, the electromagnet controlling the position of the magnetically levitated rotor in the radial direction, thereby the magnetic flux passing through the electromagnet core of the electromagnet will not be changed by the rotation of the magnetically levitated rotor, whereby core loss, such as eddy-current loss, can be made lower, and the need for disposing the electromagnet in the radial direction of the magnetically levitated rotor is eliminated, whereby a slim device can be realized.

BEST MODE FOR CARRYING OUT THE INVENTION

Hereinbelow, an embodiment of the invention will be explained with reference to the drawings.

Figure 1:
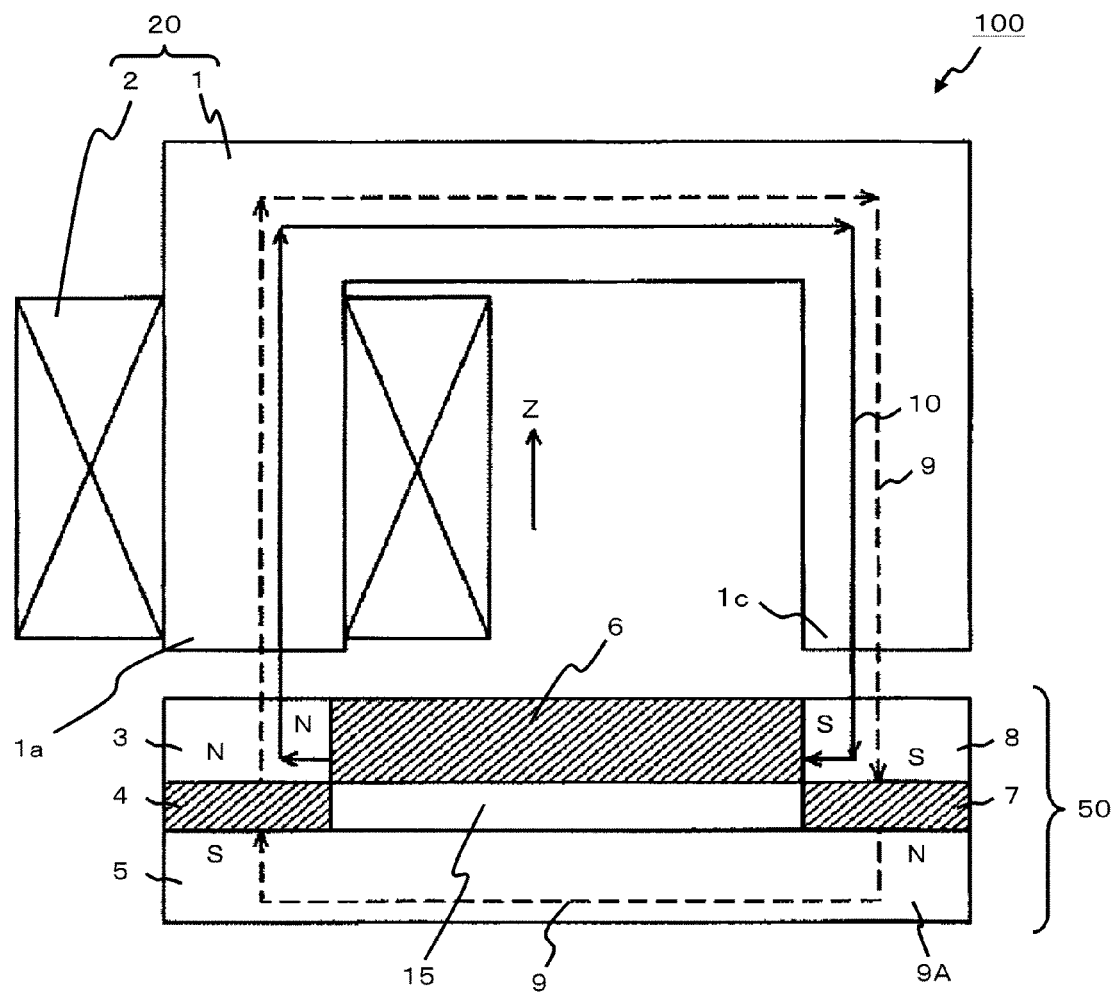
FIG. 1 is a sectional view illustrating the basic structure of a magnetic levitation control device according to an embodiment of the present invention.

FIG. 1 illustrates a basic configuration of a magnetic levitation control device 100, which is an embodiment of the present invention. In FIG. 1, reference numeral 20 denotes an electromagnet in which an electromagnet coil 2 is wound around an electromagnet core 1. Reference numerals 3, 5, and 8 denote a bar-shaped magnetic substance disposed on the left side, in the center, and on the right side, respectively; reference numerals 4 and 7 denote a bar-shaped permanent magnet disposed on the left side and the right side, respectively; and reference numeral 6 denotes a bar-shaped permanent magnet disposed in the center. The permanent magnet 4 disposed on the left side and the permanent magnet 7 disposed on the right side constitute another magnet means. Further, the electromagnet core 1 is in the shape of a letter Π, having two salient poles 1a and 1c, i.e., magnetic poles, and the two salient poles 1a and 1c are disposed in a location opposite to the magnetic substances 3 and 8, respectively.

The magnetic substances 3, 5, and 8, the permanent magnets 4 and 7, and the permanent magnet 6 disposed in the center are fixed on the object to be magnetically levitated (not shown), and they themselves provide an object to be magnetically levitated 50. The permanent magnet 6 forms a bias magnetic flux 10, and the bias magnetic flux 10 and a control magnetic flux 9 formed by the electromagnet 20 exert an attractive force on the object to be magnetically levitated 50 in the direction to attract it toward the electromagnet 20. On the other hand, on the object to be magnetically levitated 50, a separating force in the direction to separate it from the electromagnet 20 (in the downward direction in the figure) is exerted by an electromagnet or a permanent magnet (not shown), the gravity, or the like, and by balancing the separating force with the attractive force which is by the control magnetic flux 9 and the bias magnetic flux 10, the object to be magnetically levitated 50 is levitated. In addition, by changing the current passed through the electromagnet coil 2, and controlling the intensity of the control magnetic flux 9, the object to be magnetically levitated can be controlled for movement in the vertical direction (in the Z-axis direction in the figure), and further, even when the separating force exerted on the object to be magnetically levitated 50 is changed, the object to be magnetically levitated 50 can be kept in the same position by controlling the intensity of the control magnetic flux 9. Reference numeral 15 denotes a space or non-magnetic substance part.

Thus, one object to be magnetically levitated 50 configured including the permanent magnet 6, the permanent magnets 4 and 7, serving as another magnet means, and the magnetic substances 3, 5, and 8 is integrally formed in a sectional shape of a rectangle, being disposed opposite to the electromagnet 20.

The permanent magnet 6 forming the bias magnetic flux 10 is disposed in the center of the object to be supported/levitated 50 such that the magnetic poles thereof are arranged parallel to the face of the object to be supported/levitated 50 that is opposite to the electromagnet 20, the permanent magnet 6 disposed horizontally in the figure being magnetized so as to have the N pole at the left end thereof and the S pole at the right end thereof. The permanent magnet 4 disposed on the left side of the object to be magnetically levitated 50 is magnetized such that the magnetic poles thereof are arranged perpendicularly to the face of the object to be magnetically levitated 50 that is opposite to the electromagnet 20, the top face of the permanent magnet 4 being magnetized so as to be the N pole, while the bottom face thereof to be the S pole. The permanent magnet 7 disposed on the right side of the object to be supported/levitated is magnetized such that the magnetic poles thereof are arranged perpendicularly to the face of the object to be supported/levitated that is opposite to the electromagnet 20, the top face of the permanent magnet 7 being magnetized so as to be the S pole, while the bottom face thereof to be the N pole. This structure makes it easy to secure a sufficient cross-sectional area for the permanent magnets 4 and 7, whereby the magnetic reluctance of the bypass magnetic path 9A can be efficiently reduced, and thus the magnetic reluctance of the whole including the permanent magnet 6 can be reduced.

The N pole at the top face of the permanent magnet 4 on the left side is connected to the N pole shown at the left end of the permanent magnet 6 through the magnetic substance 3 opposite to the salient pole 1a of the electromagnet 20, while the S pole at the top face of the permanent magnet 7 on the right side is connected to the S pole shown at the right end of the permanent magnet 6 through the magnetic substance 8 opposite to the salient pole 1c of the electromagnet 20. In addition, the S pole at the bottom face of the permanent magnet 4 on the left side is connected to the N pole at the bottom face of the permanent magnet 7 on the right side through the magnetic substance 5.

By this connection configuration, the magnetic path, shown with a solid line in FIG. 1, of the bias magnetic flux 10, which is the permanent magnet magnetic flux generated by the permanent magnet 6, is comprised of the magnetic substance 3 on the left side, the electromagnet core 1, and the magnetic substance 8 on the right side.

In addition, the magnetic substance 3, the permanent magnet 4 on the left side, the magnetic substance 5, the permanent magnet 7 on the right side, and the magnetic substance 8 form a bypass magnetic path 9A in parallel with the permanent magnet 6 disposed in the center. In forming the bypass magnetic path 9A, for example, in the case where permanent magnets having the same performance are used, in other words, the bypass magnetic path 9A is formed of the same material having the same magnetic permeability, the plate thickness of the permanent magnet 4 and that of the permanent magnet 7 along the direction of the magnetic flux are defined to be much smaller than the plate thickness provided for the permanent magnet 6 which is in the horizontal direction in the figure. Thereby, as compared to the magnetic reluctance of the permanent magnet 6 disposed in the center, which is large, the magnetic reluctance of the bypass magnetic path 9A is small.

In this way, the bypass magnetic path 9A is magnetized in a direction in which the permanent magnets 4 and 7 block passage of the bias magnetic flux 10. In other words, the permanent magnets 4 and 7 are used as a permanent magnet for bypass magnetic path to magnetize the bypass magnetic path 9A. In the magnetic substances 3 and 8 where the permanent magnets 4 and 7 are connected to the permanent magnet 6, respectively, the permanent magnets 4 and 7 are disposed so as to provide the same poles as the magnetic poles of the permanent magnet 6 forming the bias magnetic flux 10 in the direction of the magnetic flux, thereby the bypass magnetic path 9A being magnetized in a direction in which passage of the bias magnetic flux 10 is blocked. In addition, the bypass magnetic path 9A is disposed, being formed such that the magnetic reluctance of the bypass magnetic path 9A by the permanent magnets 4 and 7 is smaller than the magnetic reluctance by the permanent magnet.

The direction of the control magnetic flux 9 may be reversed by reversing all the directions of magnetization of the permanent magnets 4, 6, and 7, and inverting the direction of the current flowing through the electromagnet coil 2; and even if this is done, the advantages of the present embodiment will not be impaired in any way. Here, the embodiment according to the present invention will be described using the aforementioned directions of magnetization of the permanent magnets 4, 6, and 7.

The dotted line shown in FIG. 1 represents the control magnetic flux 9, which is the electromagnet magnetic flux generated by the electromagnet 20 comprised of the electromagnet coil 2 and the electromagnet core 1. The control magnetic flux 9 will hardly pass the permanent magnet 6, because the permanent magnet 6 disposed in the center has a geometry which is long and slender in the lateral direction, thereby having a large magnetic reluctance. Then, a large portion of the control magnetic flux 9 generated by the electromagnet 20 will pass the bypass magnetic path 9A. In other words, the permanent magnets 4 and 7 on the left and right sides are connected to the magnetic member 5 such that the length between their magnetic poles is short, as compared to that between the magnetic poles of the permanent magnet 6, thereby the magnetic reluctance of the bypass magnetic path 9A formed by the permanent magnet 7, the magnetic substance 5, and the permanent magnet 4 is smaller than the magnetic reluctance of the permanent magnet 6, and thus the control magnetic flux 9 will pass through the bypass magnetic path 9A.

Since the bypass magnetic path 9A has a small magnetic reluctance, the control magnetic flux 9 will pass the bypass magnetic path 9A with virtually no loss generated. And, the control magnetic flux 9 passing through the bypass magnetic path 9A with virtually no loss generated passes through the permanent magnet 4 and magnetic substance 3 on the left side, being superimposed over the bias magnetic flux 10 formed by the permanent magnet 6, whereby a greater control magnetic flux for controlling the position of the object to be magnetically levitated 50 can be obtained.

Here, as described above, the N pole at the top face of the permanent magnet 4 on the left side is connected to the N pole of the permanent magnet 6 in the center through the magnetic substance 3, the like-poles being connected to each other, while the S pole at the top face of the permanent magnet 7 on the right side is connected to the S pole of the permanent magnet 6 in the center through the magnetic substance 8, the like-poles being connected to each other, thereby the bypass magnetic path 9A is magnetized in a direction in which passage of the bias magnetic flux 10 is blocked. Therefore, the bias magnetic flux 10 generated by the permanent magnet 6 in the center is prevented from being short-circuited inside the object to be supported/levitated 50, whereby loss of the bias magnetic flux 10 can be prevented.

Furthermore, also from the permanent magnet 7 and the permanent magnet 4, serving as another magnet means, constituting the bypass magnetic path 9A, a bias magnetic flux is generated. In other words, the bias magnetic flux generated from the permanent magnet 7 and the permanent magnet 4 passes through the same magnetic path as that for the control magnetic flux 9, thereby being superimposed over the control magnetic flux 9. By setting the magnetic force of the permanent magnets 4 and 7 facing the two salient poles 1a and 1c of the electromagnet core 1, respectively, such that the magnetic flux densities for the respective gaps between the respective two salient poles 1a and 1c of the electromagnet core 1 and the respective magnetic substances 3 and 8 of the object to be supported/levitated 50 are the same, the two salient poles 1a and 1c of the electromagnet 20 can exert the force of magnetic attraction under uniform conditions.

In this way, in the present embodiment, loss of the electromagnet magnetic flux 9 is prevented by the bypass magnetic path 9A; by preventing the permanent magnet 6 in the center from being short-circuited, loss of the bias magnetic flux 10 is prevented; and the bias magnetic flux generated by another magnet means is superimposed over the electromagnet magnetic flux 9, whereby a control magnetic flux can be formed which increases the overall efficiency of generation of the magnetic flux in the hybrid type magnetic bearing.

Figure 2:
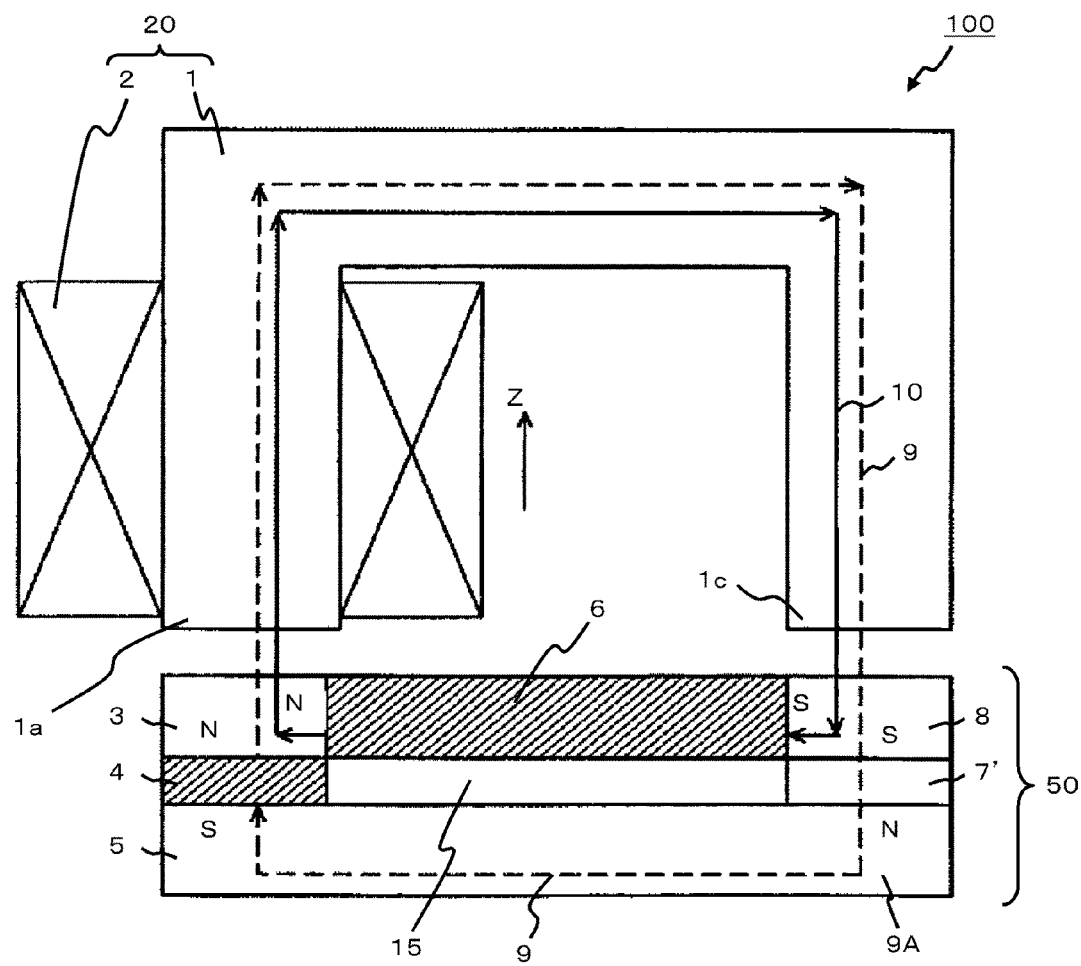
FIG. 2 is a view illustrating the structure of a modification of the embodiment of the present invention.

The embodiment shown in FIG. 1, even if modified as shown in FIG. 2, will provide the same advantages. In other words, in an example as illustrated in FIG. 2, the permanent magnet 7 shown in FIG. 1 is modified into a magnetic substance 7'. As the permanent magnet, serving as another magnet means, for magnetizing the bypass magnetic path 9A, one permanent magnet 4 is used. Thus, either one of the permanent magnets 4 and 7 may be used alone. And, the direction of the control magnetic flux 9 generated by the electromagnet 20 and that of the bias magnetic flux 10 become identical to each other in the magnetic substance 3 where the like-poles of the permanent magnet 4 and the permanent magnet 6 are contacted with each other.

Figure 3:
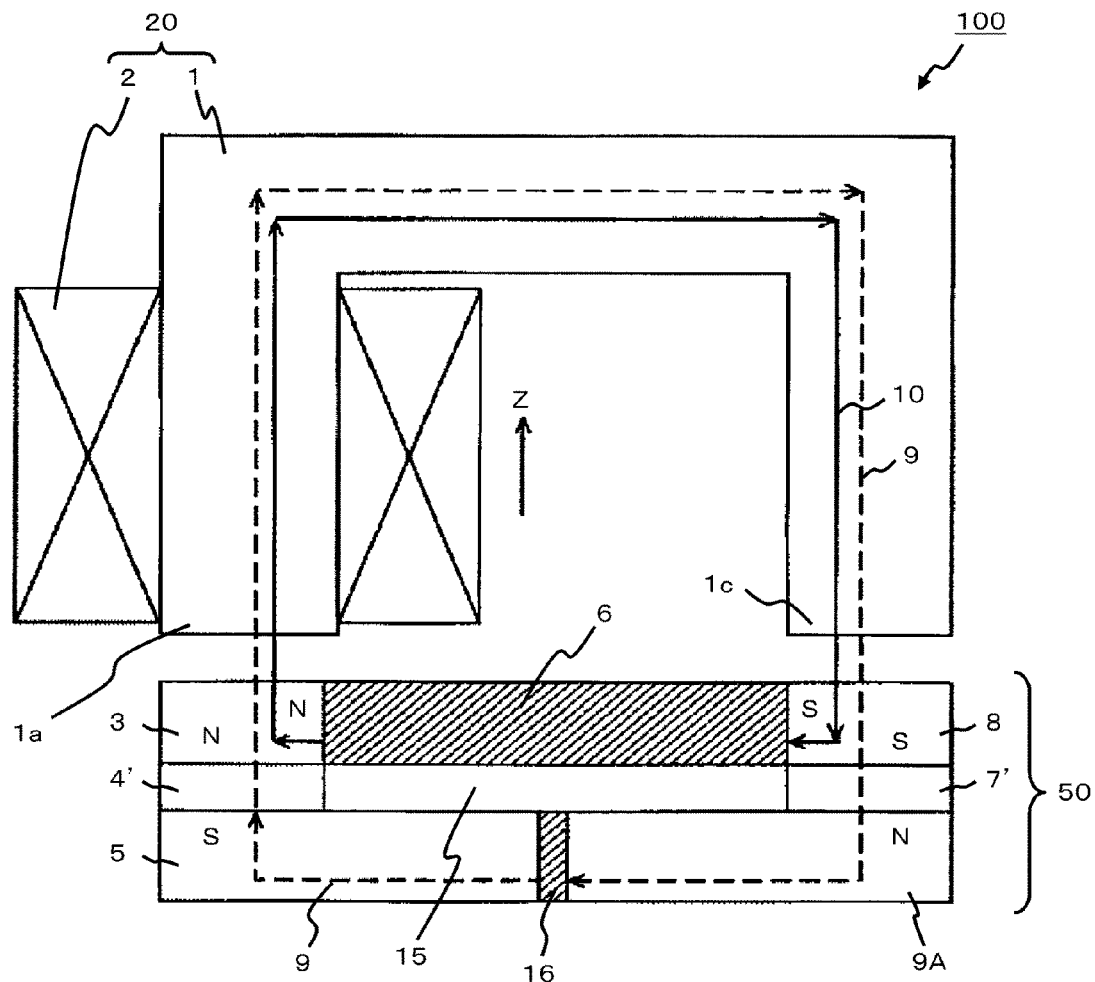
FIG. 3 is a view illustrating a further modification of the embodiment of the present invention.

Further, the embodiment shown in FIG. 2, even if modified as shown in FIG. 3, will provide the same advantages. In other words, the permanent magnet 4 shown in FIG. 2 is modified into a magnetic substance 4', a permanent magnet 16 being interposed in a portion of the magnetic substance 5. Even in this structure, the permanent magnet 16 functions as another magnet means for magnetizing the bypass magnetic path 9A constituted by the magnetic substances 3, 4', 5, 7', and 8, the bypass magnetic path 9A being magnetized in a direction in which passage of the bias magnetic flux 10 by the permanent magnet 6 is blocked, and the magnetic reluctance by the permanent magnet 16, in other words, the magnetic reluctance of the bypass magnetic path 9A being formed small, as compared to the magnetic reluctance by the permanent magnet 6.

In the aforementioned embodiment according to the present invention, a structure in which the permanent magnet 6 generating the bias magnetic flux and the permanent magnets 4 and 7, serving as another magnet means, for forming the bypass magnetic path 9A are disposed in the object to be supported/levitated 50 has been described. However, the embodiment according to the present invention is not limited to the aforementioned structure, the permanent magnet 6 generating the bias magnetic flux 10 and the permanent magnets 4 and 7, serving as another magnet means, for forming the bypass magnetic path 9A may be disposed in the electromagnet core 1, provided that the bias magnetic flux 10 by the permanent magnet 6 is superimposed over the control magnetic flux 9, and the bypass magnetic path 9A is configured such that the control magnetic flux 9 is not weakened by the magnetic reluctance of the permanent magnet 6.

Figure 4:
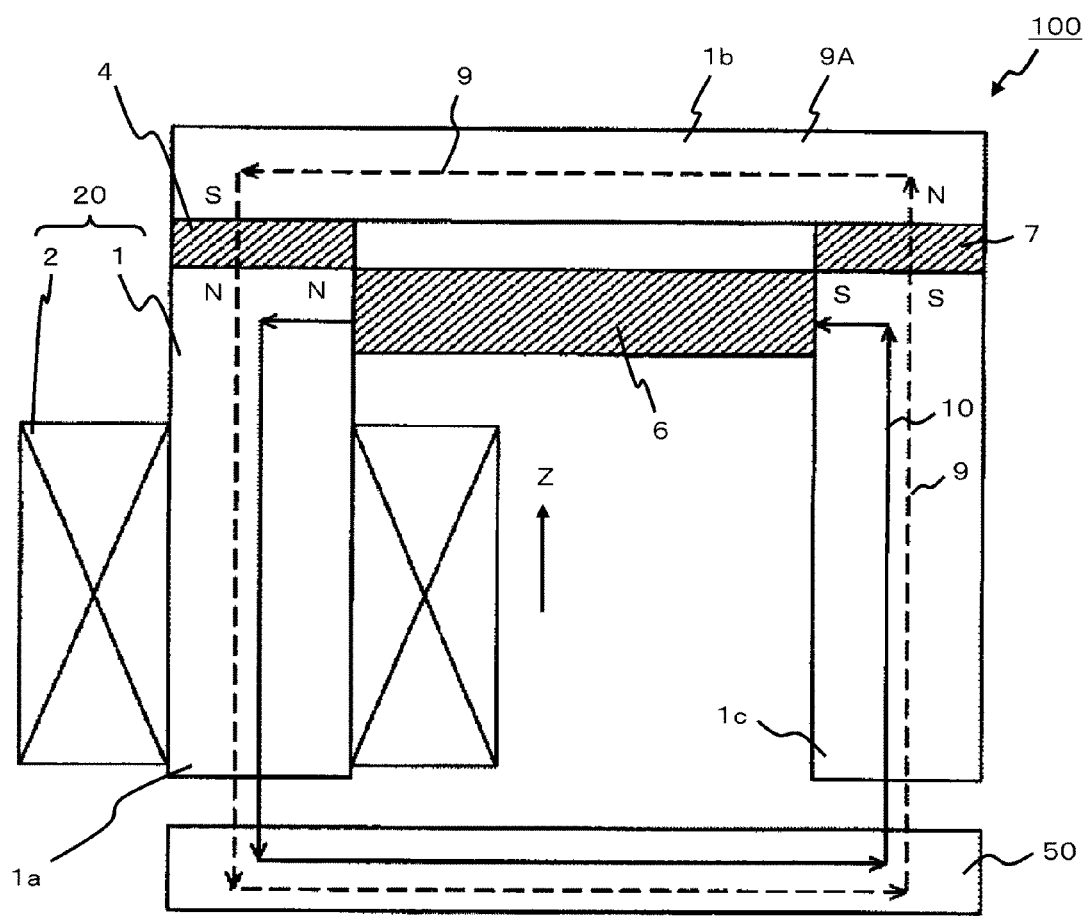
FIG. 4 is a view illustrating a still further modification of the embodiment of the present invention.

For example, in a modification of the embodiment according to the present invention as shown in FIG. 4, the permanent magnet 6 generating the bias magnetic flux 10 and the bypass magnetic path 9A are included in the electromagnet core 1 of the electromagnet 20. The electromagnet core 1 of the electromagnet 20 is in the shape of a letter Π, being comprised of a salient pole 1a and a salient pole 1c each having an open end, and a connection part 1b connecting between the salient pole 1a and the salient pole 1c, and the permanent magnet 6 is spanned across the salient pole 1a and the salient pole 1c, shunting apart of the salient pole 1a, that of the salient pole 1c, and the connection part 1b. In addition, the part of the salient pole 1a, that of the salient pole 1c, and the connection part 1b which are shunted by the permanent magnet 6 provide a bypass magnetic path 9A which is in parallel with the permanent magnet 6, and in the bypass magnetic path 9A, the permanent magnets 4 and 7, serving as another magnet means, are disposed. In the case where permanent magnets having the same performance are used, in other words, the bypass magnetic path 9A is formed of the same material having the same magnetic permeability, the plate thickness of the permanent magnet 4 on the left side and that of the permanent magnet 7 on the right side along the direction of the magnetic flux are formed smaller than the plate thickness of the permanent magnet 6 in the center along the direction of the magnetic flux, in other words, are formed such that the magnetic reluctance of the bypass magnetic path 9A by the permanent magnets 4 and 7 is smaller than the magnetic reluctance of the permanent magnet 6.

The permanent magnet 6 shown in FIG. 4 is magnetized to have the S pole at the right end in the figure where it is connected with the salient pole 1c, while being magnetized to have the N pole at the left end in the figure where it is connected with the salient pole 1a. The permanent magnet 4 on the left side is disposed on the salient pole 1a, the bottom face thereof facing the N pole of the permanent magnet 6 being magnetized to have the N pole, while the top face being magnetized to have the S pole. The permanent magnet 7 on the right side is disposed on the salient pole 1c, the bottom face thereof facing the S pole of the permanent magnet 6 being magnetized to have the S pole, while the top face being magnetized to have the N pole.

In other words, the bottom face of the permanent magnet 4 on the left side is connected to the left end of the permanent magnet 6 by the salient pole 1a, which is a part of the electromagnet core 1, while the bottom face of the permanent magnet 7 on the right side is connected to the right end of the permanent magnet 6 by the salient pole 1c, which is a part of the electromagnet core 1. In addition, the top face of the permanent magnet 4 on the left side is connected to the top face of the permanent magnet 7 on the right side by the connection part 1b, which is a part of the electromagnet core 1.

By the aforementioned connection configuration, the left end of the permanent magnet 6 that is magnetized to have the N pole is connected to the like-pole bottom face of the permanent magnet 4 on the left side, through the salient pole 1a, thereby the bias magnetic flux 10 generated from the left end of the permanent magnet 6 in the center constitutes a magnetic path as shown in the figure without being short-circuited in the electromagnet core 1.

In the present embodiment, the control magnetic flux 9 generated by the electromagnet comprised of the electromagnet coil 2 and the electromagnet core 1 is generated in the same direction as the magnetic flux direction of the bias magnetic flux 10.

Here, since the magnetic reluctance of the permanent magnet 6 is great as compared to that of the bypass magnetic path 9A, the control magnetic flux 9 will hardly pass the permanent magnet 6. However, the permanent magnet 4 on the left side and the permanent magnet 7 on the right side are formed to have a small width (thickness) along the direction of the magnetic path of the control magnetic flux 9, as compared to that of the permanent magnet 6 in the center, thereby the magnetic reluctance in the direction of the magnetic path which passes through the permanent magnet 4, the connection part 1b, and the permanent magnet 7 is smaller than that of the permanent magnet 6 in the center. Accordingly, the bypass magnetic path 9A is constituted by the permanent magnet 4 on the left side and the permanent magnet 7 on the right side which are connected to each other by the connection part 1b, and the control magnetic flux 9 passes through the bypass magnetic path 9A, which has a smaller magnetic reluctance. Thus, the control magnetic flux 9 is superimposed over the bias magnetic flux 10 without being weakened by the magnetic reluctance of the permanent magnet 6 in the center, whereby a greater control magnetic flux for controlling the position of the object to be magnetically levitated 50 can be obtained.

Figure 5:
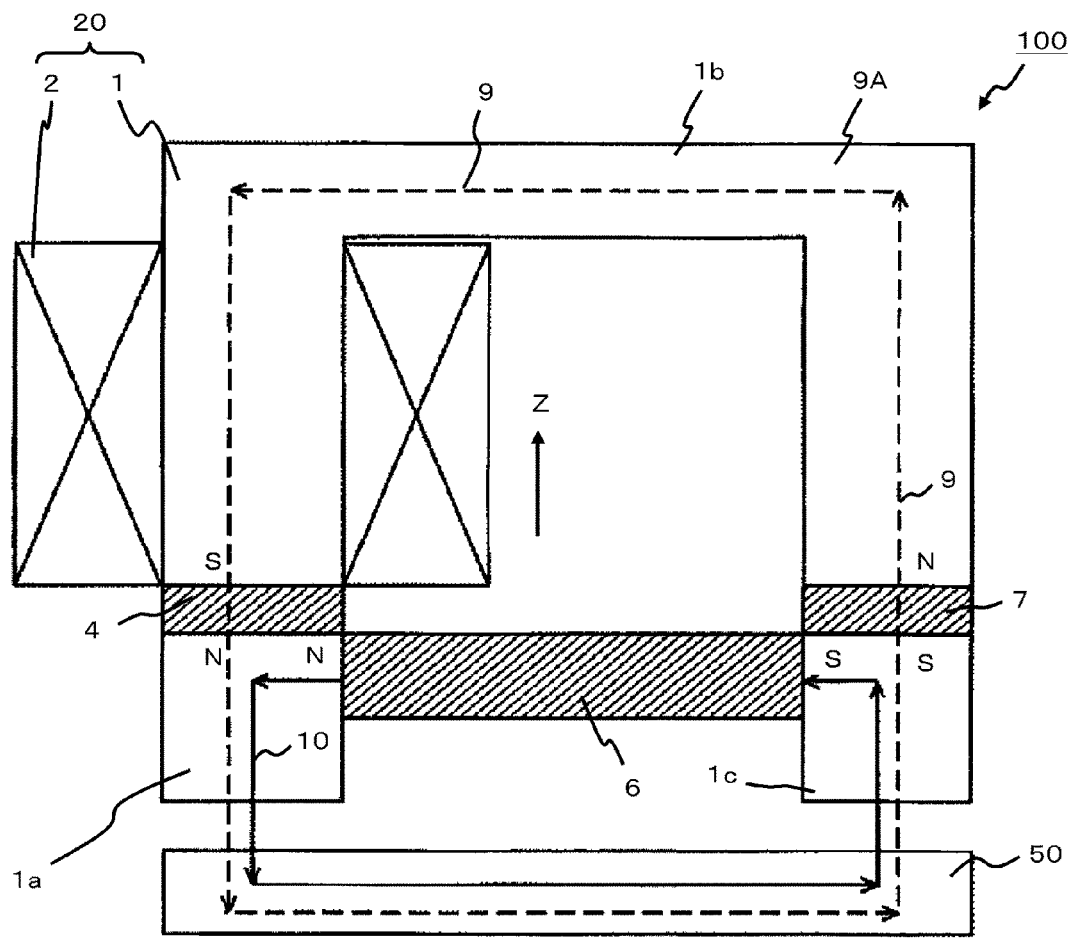
FIG. 5 is a view illustrating an application of the embodiment according to the present invention shown in FIG. 4.

Thus, in the embodiment according to the present invention, the permanent magnet 6 generating the bias magnetic flux 10, and the bypass magnetic path 9A, serving as a magnetic path for the control magnetic flux 9, may be disposed in the electromagnet core 1. In this case, the disposition of the permanent magnet 6 and the bypass magnetic path 9A is not restricted to the example as illustrated in FIG. 4, and for example, as illustrated in FIG. 5, the permanent magnet 6 may be moved to the bottom side of the electromagnet coil 2, in other words, to the distal end side of the salient poles 1a and 1c with the electromagnet coil 2 being disposed in the bypass magnetic path 9A. In this case, the magnetic pole of the permanent magnet 6 and the object to be magnetically levitated 50 can be brought closer to each other, whereby the leakage of the bias magnetic flux 10 formed by the permanent magnet 6 can be reduced, and the bias magnetic flux 10 can be more efficiently exerted on the object to be magnetically levitated 50.

In addition, also in the examples as illustrated in FIG. 4 and FIG. 5, either one of the permanent magnets 4 and 7 may be provided as another magnet means for magnetizing the bypass magnetic path 9A as shown in FIG. 2 and FIG. 3, for example.

EXAMPLES

Hereinbelow, Examples of the present invention will be described with reference to the drawings.

Example 1

Figure 6:
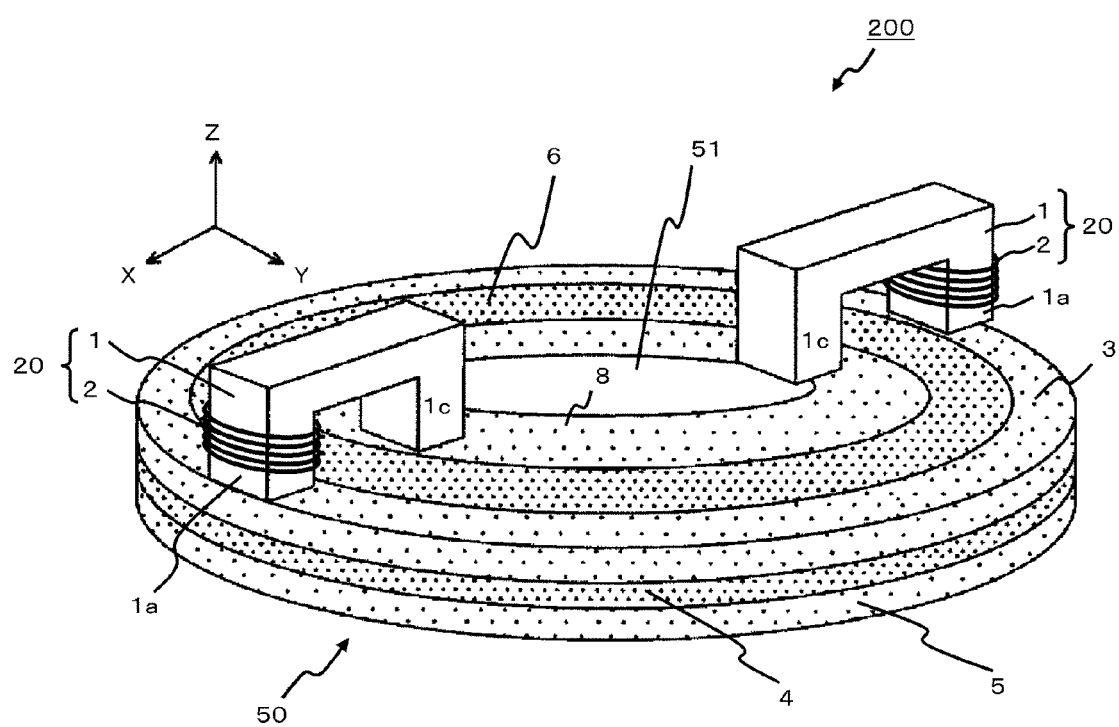
FIG. 6 is a view illustrating the structure of a hybrid type magnetic bearing according to a first Example of the present invention.

As a first Example of the present invention, a hybrid type magnetic bearing 200 for disk-shaped magnetically levitated rotor in which two magnetic levitation control devices 100 are incorporated is shown in FIG. 6. The object to be magnetically levitated 50 is provided as a disk-shaped magnetically levitated rotor having a central axis in the Z-axis direction, and a permanent magnets 4, 6, and 7, and a magnetic substance 3, 5, and 8, which have been bar-shaped in FIG. 1, are concentrically disposed about the axis provided in the direction in which the disk-shaped magnetically levitated rotor, i.e., the object to be magnetically levitated 50, is to be controlled for movement, in other words, the central axis of the magnetically levitated rotor in the present Example, the inside thereof being filled with a non-magnetic substance 51. The section on one side of the hybrid type magnetic bearing 200 shown in FIG. 6 is the same as the section of the magnetic levitation control device 100 shown in FIG. 1, even if the magnetically levitated rotor, i.e., the object to be magnetically levitated 50, is a rotating body, and the numeral references in FIG. 1 correspond to the numeral references in FIG. 6, respectively. In the present Example, as shown in FIG. 6, two magnetic levitation control devices 100 are used, the two electromagnets 20 being disposed such that they face the magnetically levitated rotor, i.e., the object to be magnetically levitated 50, from the axial direction.

Figure 7:
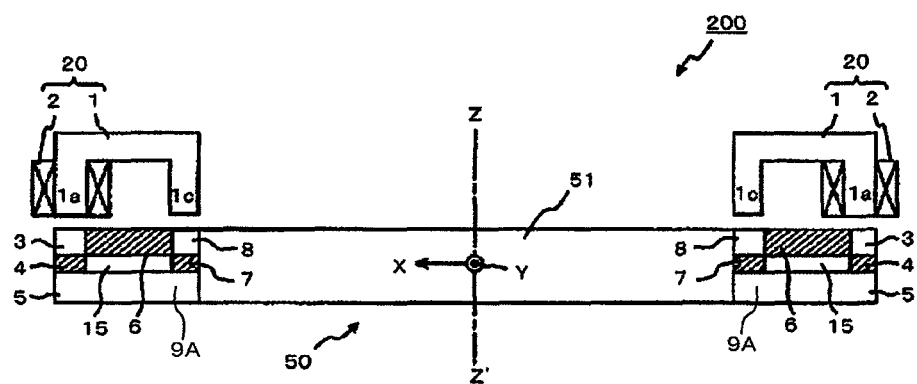
FIG. 7 is a view illustrating the section of a hybrid type magnetic bearing according to the first Example of the present invention.

The section of the hybrid type magnetic bearing 200 shown in FIG. 6, in which two magnetic levitation control devices 100 are incorporated, is shown in FIG. 7. In the respective figures, the same numeral reference denotes the same part, and two magnetic levitation control devices 100 having an electromagnet 20 comprised of an electromagnet core 1 and an electromagnet coil 2 are disposed on the left and right sides.

In this case, the permanent magnet 6 is torus-shaped, being magnetized in the radial direction (in a direction orthogonal to the Z-axis) (for example, to provide the N pole on the outer circumference side and the S pole on the inner circumference side), and in the present Example, being sandwiched in the radial direction between the torus-shaped magnetic substances 3 and 8. In addition, the permanent magnet 4 is also torus-shaped, and in the present Example, is magnetized in the vertical direction (in the Z-axis direction) (for example, to provide the N pole on the top side and the S pole on the bottom side), being sandwiched in the vertical direction (in the Z-axis direction) between the torus-shaped magnetic substances 3 and 5. Further, the permanent magnet 7 is also torus-shaped, and in the present Example, is disposed under the magnetic substance 8, being sandwiched in the vertical direction (in the Z-axis direction) between the torus-shaped magnetic substances 8 and 5. By this structure, in the same way as in the example shown in FIG. 1, a torus-shaped bypass magnetic path 9A connecting between the respective magnetic poles of the torus-shaped permanent magnet 6 is formed by the magnetic substance 3, the permanent magnet 4, the magnetic substance 5, the permanent magnet 7, and the magnetic substance 8 in parallel with the permanent magnet 6 in the radial direction of the object to be magnetically levitated 50, i.e., the magnetically levitated rotor. The thickness of the permanent magnet 4 along the radial direction is preferably equal to that of the magnetic substance 3. The thickness along the radial direction of the magnetic substance 5 is preferably equal to the value obtained by summing up the thicknesses of the magnetic substance 3, the permanent magnet 6, and the magnetic substance 8 along the radial direction. In the present Example 1, the geometries of the permanent magnet 6, the permanent magnet 4, and the permanent magnet 7 are defined to be torus-shaped, however, the geometries thereof are not restricted to a torus-shaped one, provided that the permanent magnet 6, the permanent magnet 4, and the permanent magnet 7 are concentrically disposed. For example, plural arc-shaped permanent magnets may be concentrically disposed, or a number of bar-shaped magnets may be concentrically disposed.

The position where the electromagnet coil 2 is wound around the electromagnet core 1 is the same as that in the example shown in FIG. 1. In FIG. 6, the permanent magnet 7 in FIG. 1 is disposed under the magnetic substance 8, however, it is not visible from the outside. By disposing the electromagnet 20 on either side of the disk-shaped object to be magnetically levitated 50 having thus arranged magnets such that the salient pole 1a faces the magnetic substance 3 and the salient pole 1c faces the magnetic substance 8, respectively, an attractive force can be generated and exerted on the object to be magnetically levitated 50, and by balancing the attractive force with the force in the downward direction that is exerted on the object to be magnetically levitated 50, in other words, the separating force exerted in the direction to separate it from the electromagnet 20, the object to be magnetically levitated 50 is levitated, thereby the axial position of the object to be magnetically levitated 50 can be controlled. As the separating force exerted on the object to be magnetically levitated 50, the attractive force by a motor stator (not shown) for rotating the object to be magnetically levitated 50 that is disposed under the object to be magnetically levitated 50, in other words, on the side opposite to the side on which the electromagnet 20 is disposed, the gravity exerted on the object to be magnetically levitated 50, or the like can be considered.

In the present Example, two magnetic levitation control devices 100 are disposed in the X-axis direction, and thus by the axial position control by the magnetic levitation control device 100, the pivotal movement about the Y axis can be easily controlled, however, a single magnetic levitation control device 100 can control the pivotal movement about the Y axis, provided that it is disposed, being sufficiently displaced from the Y axis. In addition, by disposing another pair of magnetic levitation control devices 100 in a position orthogonal to the magnetic levitation control devices 100 in the figure, the pivotal movement about the X axis can be easily controlled, however, a single magnetic levitation control device 100 can control the pivotal movement about the X axis, provided that it is disposed, being sufficiently displaced from the X axis. Further, in the case where the position in the Z axis and the pivotal movement about the X and Y axes are to be controlled, measurement of the position in the Z axis and the degree of pivotal movement about the X and Y two axes is performed, and in order to apply an open-loop control, at least three non-contact type position sensors, such as eddy-current sensors, are disposed on the top (or bottom) face of the disk-shaped object to be magnetically levitated 50.

In the present Example, the permanent magnet 6 which is concentrically disposed, being magnetized in the radial direction, and the torus-shaped bypass magnetic path 9A connecting between the respective magnetic poles of the permanent magnet 6 are provided in the object to be magnetically levitated 50, i.e., the magnetically levitated rotor, the electromagnet core 1 of the electromagnet 20 being disposed on the concentric circles, and the magnetic flux passing through the electromagnet core 1 of the electromagnet 20 will not be changed by the rotation of the disk-shaped object to be magnetically levitated 50, whereby a hybrid type magnetic bearing 200 which is low in core loss, such as eddy-current loss, can be configured. Further, the bypass magnetic path 9A is also provided in correspondence with the permanent magnet 6 which is concentrically disposed, and thus, provided that it is concentrically disposed, the geometry thereof need not always be torus-shaped.

In the present Example, the case where the object to be magnetically levitated 50 is a disk-shaped magnetically levitated rotor has been described. However, the geometry of the object to be magnetically levitated 50 is not restricted to that of a disk-shaped magnetically levitated rotor, and may be that of a torus-shaped magnetically levitated rotor, the inside of which is hollow.

Example 2

Figure 8:
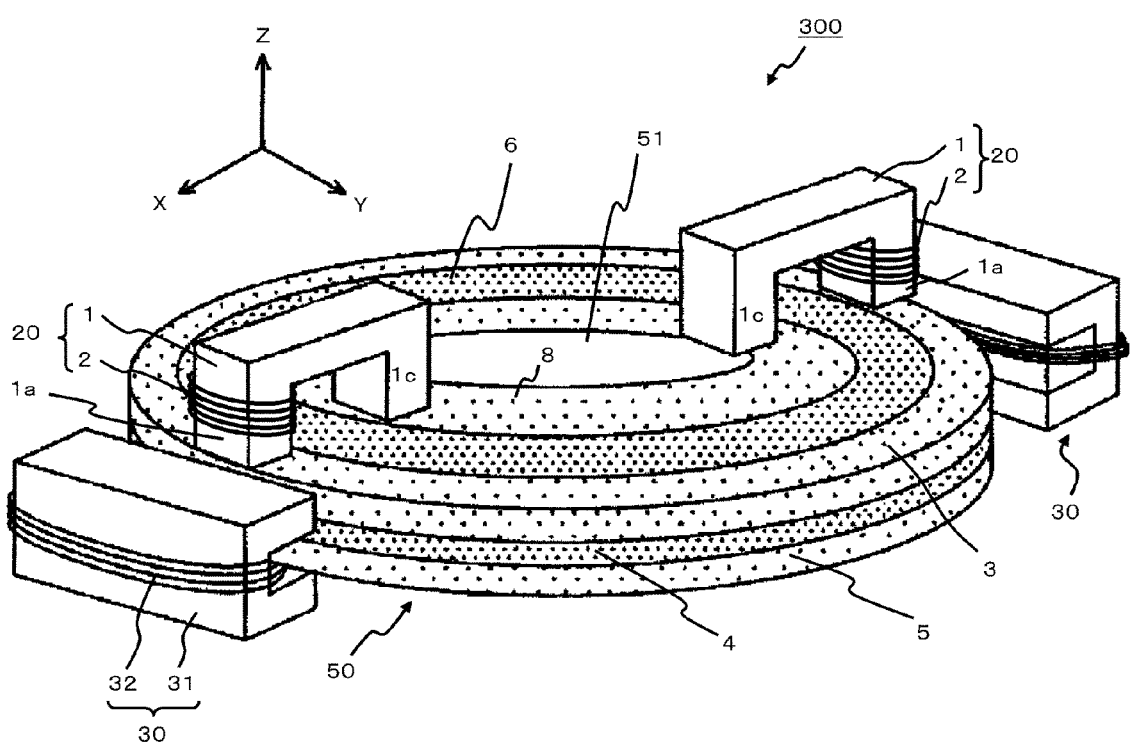
FIG. 8 is a view illustrating the structure of a hybrid type magnetic bearing according to a second Example of the present invention.

In FIG. 8, the structure of a hybrid type magnetic bearing 300 for disk-shaped magnetically levitated rotor as a second Example of the present invention is shown.

Being added to the hybrid type magnetic bearing 200 according to the first Example shown in FIG. 6, a pair of radial direction electromagnets 30 is disposed, as shown in FIG. 8, facing the outer circumference of the disk-shaped magnetically levitated rotor, i.e., the object to be magnetically levitated 50, from the radial direction, and the salient poles of a electromagnet core 31 of the radial direction electromagnet 30 are disposed so as to face the magnetic substance 3 and the magnetic substance 5, respectively, which are exposed to the outer circumference of the object to be magnetically levitated 50, thereby the magnetic flux generated by the permanent magnet 6 and the permanent magnet 4 being passed through the electromagnet core 31 of the radial direction electromagnet 30. In this state, if current is conducted through the electromagnet coil 32, it is possible to control the intensity of the magnetic flux in the gap between the electromagnet core 31 and the outer circumference edge of the torus-shaped levitated body, i.e., the object to be magnetically levitated 50, whereby the position of the torus-shaped levitated body, i.e., the object to be magnetically levitated 50, in the radial direction, for example, in the X-axis direction can be controlled.

By disposing another pair of radial direction electromagnets 30 for controlling the position in the radial direction such that it is orthogonal to the radial direction electromagnets 30 in FIG. 8, facing the outer circumference edge of the disk-shaped levitated body, i.e., the object to be magnetically levitated 50, it is also possible to control the position of the object to be magnetically levitated 50 in the radial direction, for example, in the Y-axis direction. Therefore, by using two pairs of electromagnets 20 for controlling the axial position and two pairs of radial direction electromagnets 30 for controlling the radial position, five-axis control, i.e., position control in the X-, Y-, and Z-axis three directions and control of pivotal movement about the X and Y two axes can be performed. Further, in the case where position in the X-, Y-, and Z-axis three directions and pivotal movement about the X and Y two axes are to be controlled, measurement of the position in the X-, Y-, and Z-axis three directions and the degree of pivotal movement about the X and Y two axes is performed, and in order to apply an open-loop control, at least three non-contact type position sensors (for position in the Z-axis direction and degree of pivotal movement about the X and Y two axes), such as eddy-current sensors, are disposed on the top (or bottom) face of the object to be magnetically levitated 50, while two (for position in the X and Y axis directions) being disposed on the outer circumference in the radial direction. In addition, by giving such a configuration, the gravitational force exerted on the object to be magnetically levitated 50 from various directions depending on the posture of the hybrid type magnetic bearing 300 can be accommodated.

With the hybrid type magnetic bearing 300 thus configured, the magnetic flux flowing through the electromagnet core 31 of the radial direction electromagnet 30 will not be changed by the rotation of the torus-shaped levitated body, whereby a hybrid type magnetic bearing 300 which is low in core loss, such as eddy-current loss, can be configured.

Further, the geometry of the magnetically levitated rotor in the present Example is not restricted to a disk-shape, and may be a torus-shape, the inside of which is hollow.

Here, in the case where the magnetically levitated rotor is torus-shaped, the disposition of the radial direction electromagnets 30 in the present Example is not restricted to that as shown in FIG. 8, and for example, even if the radial direction electromagnets 30 comprised of the electromagnet core 31 and the electromagnet coil 32 are disposed back-to-back in the central portion of the torus, the salient poles of the radial direction electromagnet 30 being disposed so as to face the magnetic substances 8 and 5, the same advantages can be obtained.

Example 3

Figure 9:
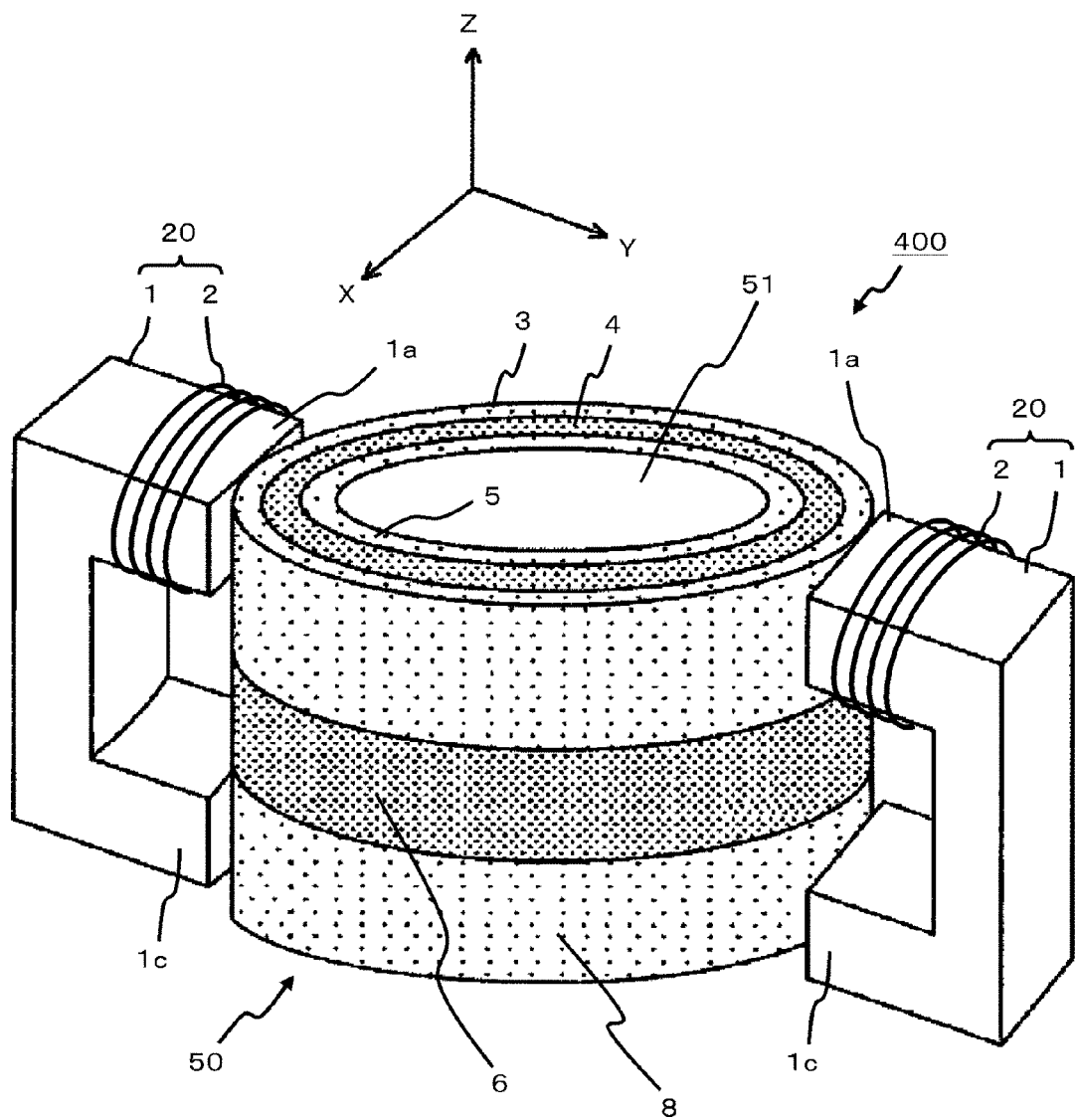
FIG. 9 is a view illustrating the structure of a hybrid type magnetic bearing according to a third Example of the present invention.
Figure 10:
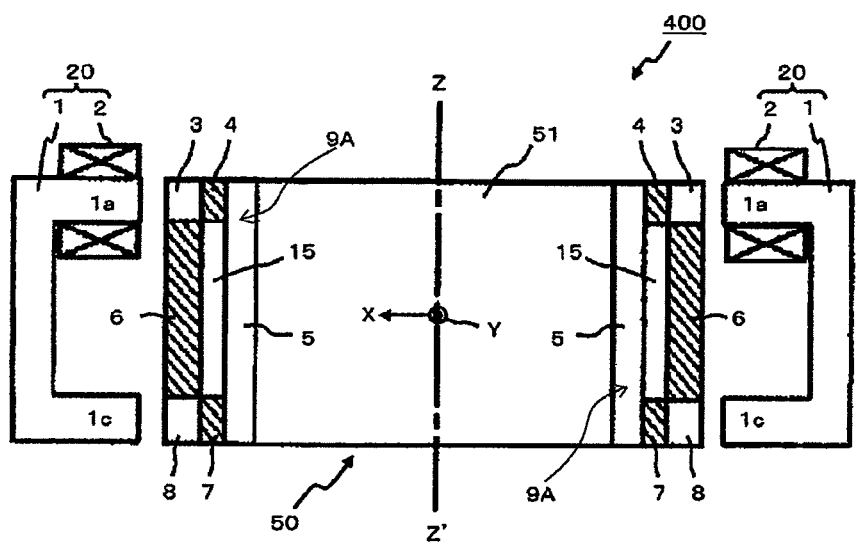
FIG. 10 is a view illustrating the section of the third Example shown in FIG. 9.

In FIG. 9, as a third Example of the present invention, there is given an example of configuration of a hybrid type magnetic bearing 400 for cylinder-shaped magnetically levitated rotor in which two magnetic levitation control devices 100 are incorporated. In addition, a sectional view of the hybrid type magnetic bearing 400 shown in FIG. 9 is shown in FIG. 10. In the respective figures, the same numeral reference denotes the same part, and the electromagnet 20 comprised of the electromagnet core 1 and the electromagnet coil 2 is disposed on the left and right sides, in other words, the electromagnet 20 constituting the magnetic levitation control device 100 is disposed so as to face a flank of the magnetically levitated rotor, i.e., the object to be magnetically levitated 50, in other words, face the magnetically levitated rotor from the radial direction, thereby the sectional view of the hybrid type magnetic bearing 400 including two electromagnets 20 being as given in FIG. 10.

The permanent magnet 6, which is expressed as a bar-shaped one in FIG. 1, is cylinder-shaped as shown in FIG. 9 in the third Example. The permanent magnets 4, 6, and 7, and the magnetic substances 3, 5, and 8, which have been bar-shaped in FIG. 1, are concentrically disposed about the central axis of the cylinder-shaped magnetically levitated rotor, i.e., the object to be magnetically levitated 50, the inside thereof being filled with a non-magnetic substance 51. In the present Example, the inside is defined as the non-magnetic substance 51, however, the inside need not be a non-magnetic substance, and in the case where it is formed of, for example, a magnetic substance, the inside will function as the magnetic substance 5. The permanent magnet 6 is magnetized in the vertical direction in FIG. 9, in other words, in the axial direction of the cylinder-shaped magnetically levitated rotor (for example, to provide the N pole on the top side and the S pole on the bottom side), being sandwiched between the torus-shaped magnetic substances 3 and 8 in the vertical direction (the Z-axis direction) in the present Example. In addition, the permanent magnet 4 is cylinder-shaped, and is magnetized in the radial direction in the present Example (for example, to provide the N pole on the outer circumference side and the S pole on the inner circumference side), being sandwiched between the cylinder-shaped magnetic substances 3 and 5 in the radial direction. Further, the permanent magnet 7 is cylinder-shaped, and in the present Example, is disposed inside of the magnetic substance 8, being sandwiched between the cylinder-shaped magnetic substances 8 and 5 in the radial direction. By this configuration, in the same way as in the example shown in FIG. 1, a torus-shaped bypass magnetic path 9A connecting between the respective magnetic poles of the cylinder-shaped permanent magnet 6 is formed by the magnetic substance 3, the permanent magnet 4, the magnetic substance 5, the permanent magnet 7, and the magnetic substance 8 in parallel with the permanent magnet 6 in the axial direction of the object to be magnetically levitated 50, i.e., the magnetically levitated rotor. The height of the permanent magnet 4 in the vertical direction is preferably equal to that of the magnetic substance 3. The height of the magnetic substance 5 in the vertical direction is preferably equal to the value obtained by summing up the heights of the magnetic substance 3, the permanent magnet 6, and the magnetic substance 8. The place where the electromagnet coil is wound around the core is the same as that in the example as shown in FIG. 1. In this figure, the permanent magnet 7 in FIG. 1 is disposed inside of the magnetic substance 8, however, it is not visible from the outside.

By disposing the electromagnet 20 on the circumference face of the cylinder-shaped object to be magnetically levitated 50 having thus arranged magnets such that the salient pole 1a faces the magnetic substance 3 and the salient pole 1c faces the magnetic substance 8, respectively, an attractive force can be exerted on the object to be magnetically levitated 50 in the radial direction. Accordingly, by disposing a pair of electromagnets 20 so as to face the Y-axis direction shown in FIG. 9, which is the radial (right and left) direction of the object to be magnetically levitated 50, an attractive force can be exerted on the object to be magnetically levitated 50 in the radial direction of the levitated body in the Y-axis direction in the push-pull mode, whereby the position in the Y-axis direction can be controlled. In addition, by disposing another pair of electromagnets 20 for controlling the position in the radial direction in a location orthogonal to the electromagnets 20 in FIG. 9, in other words, disposing so as to face the X-axis direction, an attractive force can be generated also in the X-axis direction. By giving such a configuration, the position of the object to be magnetically levitated 50 can be controlled to any point on the X- and Y-axis two dimensional plane with the use of the attractive force generated, and even if the gravity is exerted in the downward direction, for example, a sufficiently strong attractive force can be generated, whereby the object to be magnetically levitated 50 can be attracted in the radial direction, thereby allowing it to be levitated. In this case, in order to perform measurement of the position in the X- and Y-axis directions and to apply an open-loop control, two non-contact type position sensors, such as eddy-current sensors, are disposed on the outer circumference of the cylinder-shaped levitated body.

In this hybrid type magnetic bearing 400, the magnetic flux passing through the electromagnet core 1 of the electromagnet 20 will not be changed by the rotation of the object to be magnetically levitated 50, whereby a hybrid type magnetic bearing 400 which is low in core loss, such as eddy-current loss, can be configured.

In addition, the object to be magnetically levitated 50 in the present Example is not restricted to a cylinder-shaped magnetically levitated rotor, and may be a cylinder-shaped magnetically levitated rotor the inside of which is hollow.

In the case where the object to be magnetically levitated 50 is a cylinder-shaped magnetically levitated rotor, the disposition of the permanent magnets and the magnetic substances in the present Example is not restricted to that as shown in FIG. 9, and for example, the magnetic substance 5 may be disposed on the outer circumference side of the cylinder, while the magnetic substances 3 and 8 and the permanent magnet 6 may be disposed on the inner circumference side of the cylinder. In this case, even if the electromagnets 20 comprised of the electromagnet core 1 and the electromagnet coil 2 are disposed back-to-back in the central portion of the cylinder, the salient poles (the portions of the electromagnet core 1 that convexly extend) being disposed so as to face the magnetic substance 3 and the magnetic substance 8, the same advantages can be obtained.

Example 4

Figure 11:
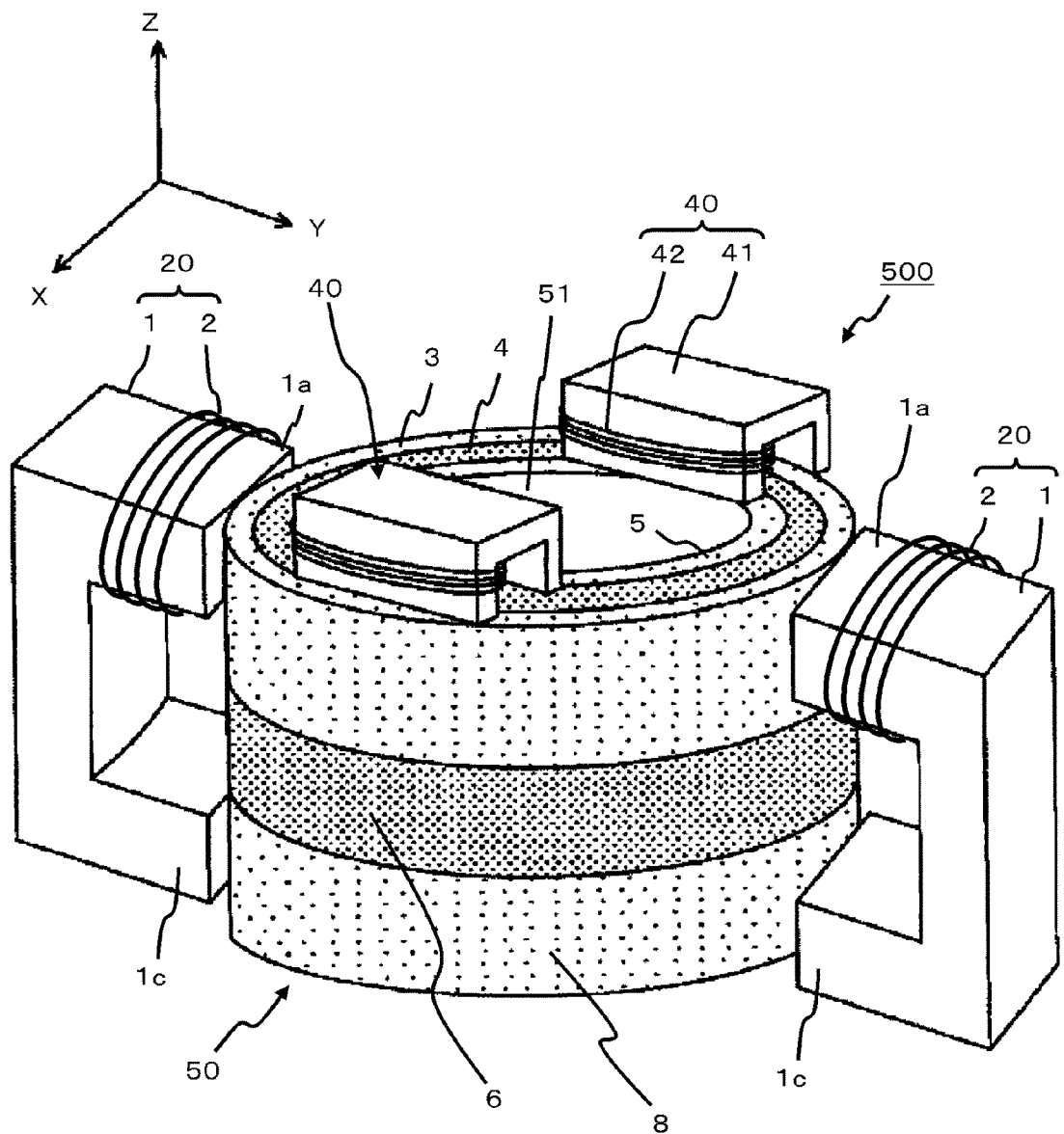
FIG. 11 is a view illustrating the structure of a hybrid type magnetic bearing according to a fourth Example of the present invention.

In FIG. 11, there is given an example of configuration of a hybrid type magnetic bearing 500 for cylinder-shaped magnetically levitated rotor as a fourth Example of the present invention. In FIG. 11 and the other figures, the same numeral reference denotes the same part, and the electromagnet 20 comprised of the electromagnet core 1 and the electromagnet coil 2 is disposed on the left and right sides, in other words, two electromagnets 20 are disposed so as to face the magnetically levitated rotor from the radial direction.

Being added to the hybrid type magnetic bearing 400 according to the third Example shown in FIG. 9, a pair of axial direction electromagnets 40 is disposed, as shown in FIG. 11, so as to face the top face of the cylinder-shaped magnetically levitated rotor, i.e., the object to be magnetically levitated 50, and the salient poles of the electromagnet core 41 of the axial direction electromagnet 40 are disposed so as to face the magnetic substance 3 and the magnetic substance 5 exposed to the top face of the object to be magnetically levitated 50, respectively, thereby the two magnetic fluxes generated by the permanent magnet 6 and the permanent magnet 4, serving as another magnet means, are superimposed over each other to be passed through the electromagnet core 1. In this state, if current is conducted through the electromagnet coil 42, it is possible to control the intensity of the magnetic flux in the gap between the electromagnet core 41 and the top face of the cylinder-shaped levitated body, i.e., the object to be magnetically levitated 50, whereby the position of the cylinder, i.e., the object to be magnetically levitated 50, in the axial direction, i.e., the Z-axis direction, and the pivotal movement about, for example, the Y axis, which is orthogonal to the Z-axis direction, can also be controlled. By disposing another pair of axial direction electromagnets 40 so as to face the top face of the cylinder-shaped levitated body, i.e., the object to be magnetically levitated 50, such that they are orthogonal to the axial direction electromagnets 40 in FIG. 11, the pivotal movement about, for example, the X axis, which is orthogonal to the Z-axis direction, of the cylinder-shaped levitated body, i.e., the object to be magnetically levitated 50 can also be controlled. Therefore, by using two pairs of electromagnets 20 for controlling the radial position and two pairs of axial direction electromagnets 40 for controlling the axial position, five-axis control, i.e., position control in the X-, Y-, and Z-axis three directions and control of pivotal movement about the X and Y two axes can be performed. Further, in the case where position in the X-, Y-, and Z-axis three directions and pivotal movement about the X and Y two axes are to be controlled, measurement of the position in the X-, Y-, and Z-axis three directions and the degree of pivotal movement about the X and Y two axes is performed, and in order to apply an open-loop control, at least three non-contact type position sensors (for position in the Z-axis direction and degree of pivotal movement about the X and Y two axes), such as eddy-current sensors, are disposed on the top (or bottom) face of the object to be magnetically levitated 50, while two (for position in the X- and Y-axis directions) being disposed on the outer circumference in the radial direction. In addition, by giving such a configuration, the gravitational force exerted on the object to be magnetically levitated 50 as a downward force from various directions depending on the posture of the hybrid type magnetic bearing 300 can be accommodated.

In the hybrid type magnetic bearing 500 thus configured, the magnetic flux flowing through the electromagnet core 41 of the electromagnet 20 will not be changed by the rotation of the cylinder-shaped levitated body, whereby a hybrid type magnetic bearing 500 which is low in core loss, such as eddy-current loss, can be configured.

In addition, the object to be magnetically levitated 50 in the present Example is not restricted to a cylinder-shaped magnetically levitated rotor, and may be a cylinder-shaped magnetically levitated rotor the inside of which is hollow.

In the case where the object to be magnetically levitated 50 is cylinder-shaped, the disposition of the permanent magnets and the magnetic substances in the present Example is not restricted to that as shown in FIG. 11, and for example, the magnetic substance 5 may be disposed on the outer circumference side of the cylinder, while the magnetic substances 3 and 8 and the permanent magnet 6 may be disposed on the inner circumference side of the cylinder. In this case, even if the electromagnets 20 comprised of the electromagnet core 1 and the electromagnet coil 2 are disposed back-to-back in the central portion of the cylinder, the salient poles (the portions of the electromagnet core 1 that protrude convexly) being disposed so as to face the magnetic substance 3 and the magnetic substance 8, the same advantages can be obtained.

Figure 12:
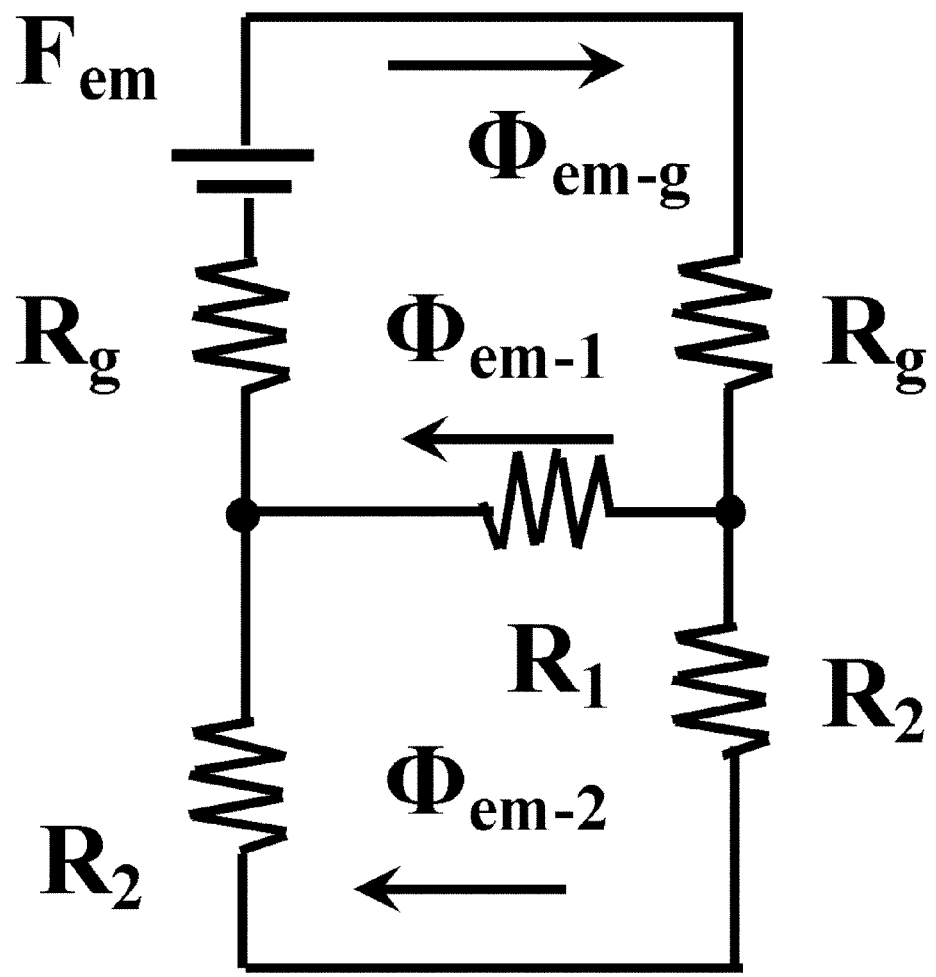
FIG. 12 is a magnetic equivalent circuit seen by the electromagnet of the magnetic levitation control device shown in FIG. 1.

Next, the relationship between the magnetic reluctance of the permanent magnet 6 and the magnetic reluctance of the respective permanent magnets 4 and 7 of the bypass magnetic path 9A in the magnetic levitation control device shown in FIG. 1 will be discussed using a magnetic equivalent circuit seen by the electromagnet 20 shown in FIG. 12. In FIG. 12, $F_{em}$ denotes the magnetomotive force of the electromagnet 20; $\Phi_{em-g}$ the magnetic flux in the air gap in the circuit (the air gap between the respective salient poles 1a and 1c and the object to be magnetically levitated 50); $\Phi_{em-1}$ the magnetic flux passing through the permanent magnet 6; $\Phi_{em-2}$ the magnetic flux passing through the respective permanent magnets 4 and 7; $R_g$ the magnetic reluctance of the respective air gaps in the circuit; $R_1$ the magnetic reluctance of the permanent magnet 6; and $R_2$ the magnetic reluctance of the respective permanent magnets 4 and 7, respectively.

In the magnetic equivalent circuit shown in FIG. 12, the combined resistance $R_c$ of the entire circuit is given by:

$$R_c = 2R_g + [1/\{(1/R_1) + (1/2R_2)\}]$$
$$= 2R_g + 2R_1 R_2 / (R_1 + R_2)$$

Here, using the magnetic reluctance of the permanent magnet 6 as the reference, the magnetic reluctance of the respective permanent magnets 4 and 7 is expressed as $R_2 = kR_1$, then, $$R_c = 2R_g + R_1 \cdot 2k/(2k+1)$$

is given, and it is found that the combined resistance $R_c$ of the entire circuit depends upon the factor:

$$2k/(2k+1)$$

The $2k/(2k+1)$ which is a factor applied to the magnetic reluctance $R_1$ of the permanent magnet 6 becomes 1, if the value of k is extremely great, as compared to 1, in other words, the magnetic reluctance $R_2$ of the respective permanent magnets 4 and 7 is extremely great, as compared to the magnetic reluctance $R_1$ of the permanent magnet 6, and if not so, always becomes less than 1. Accordingly, by providing the bypass magnetic path 9A, the magnetic reluctance $R_c$ of the entire circuit is reduced, thereby the generated magnetic flux and the generated attractive force by the electromagnet 20 being increased.

Figure 13:
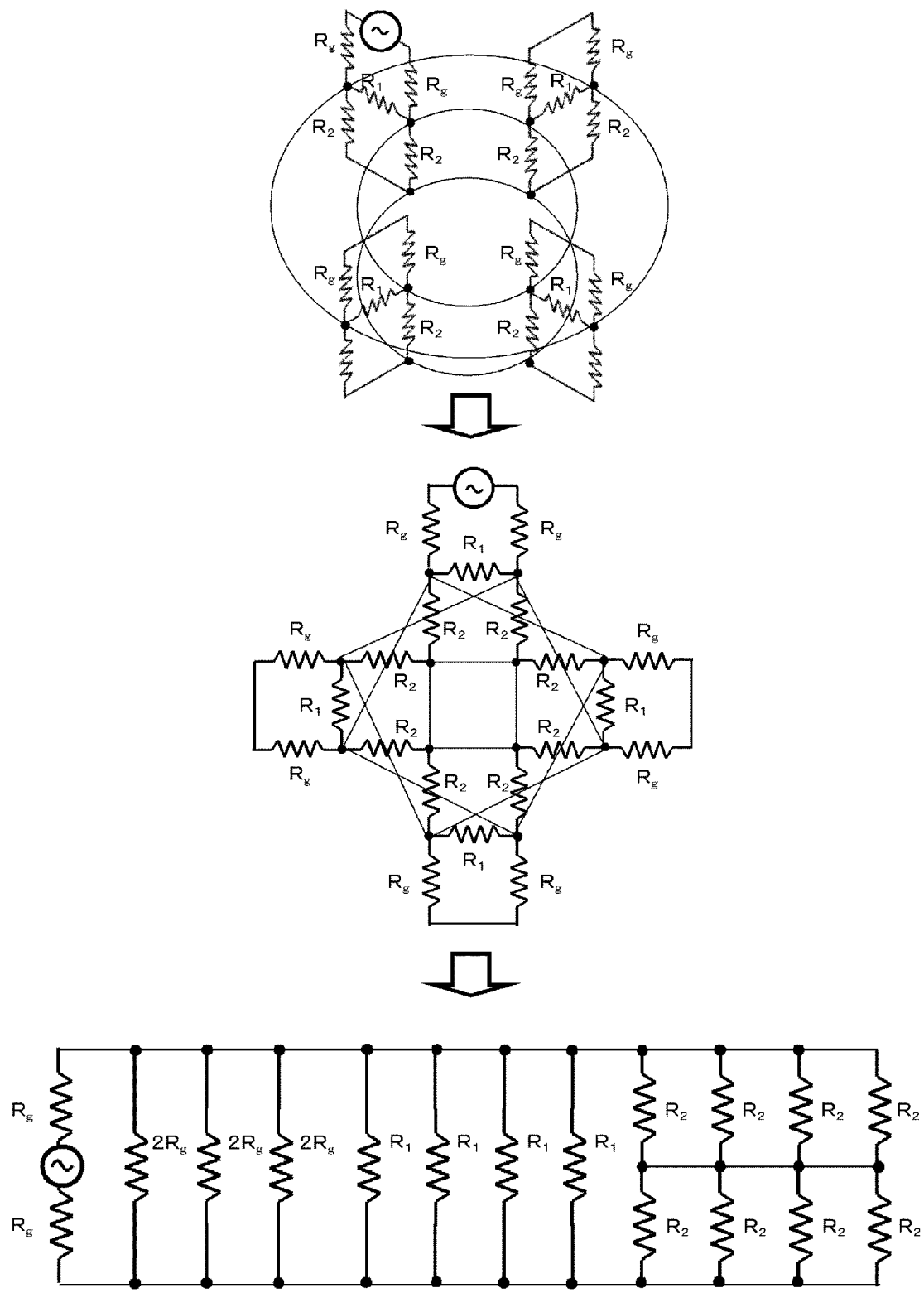
FIG. 13 is a magnetic equivalent circuit seen by plural electromagnets in a magnetic levitation control device wherein the plural electromagnets are disposed as shown in FIG. 6.

In the case where, as shown in FIG. 6, plural electromagnets 20 are disposed on a disk-shaped magnetically levitated rotor, the magnetic flux generated by the electromagnet 20 is passed through the magnetic substance 3, 8, then being passed through another electromagnet 20, thereby taking a three-dimensional path. Then, for a model of hybrid type magnetic bearing in which four electromagnets 20 are disposed on a disk-shaped magnetically levitated rotor, a magnetic equivalent circuit seen by the electromagnet 20 that is shown in FIG. 13 can be used for discussion.

For the magnetic equivalent circuit shown in FIG. 12, the combined resistance $R_c$ of the entire circuit is expressed by:

$$R_c = 2R_g + [1/\{(3/2R_g) + (4/R_1) + (2/R_2)\}]$$

Here, it is found that the $(2/R_2)$, which is a value attributive to the magnetic reluctance of the respective permanent magnets 4 and 7, becomes 0 when $R_2 = \infty$, in other words, in the case where the bypass magnetic path 9A is not provided, while, in the case where the bypass magnetic path 9A is provided, the $(2/R_2)$ always becomes a value greater than 0, thereby the combined resistance $R_c$ of the entire circuit being reduced.

In this way, the verification using the magnetic equivalent circuit shown in FIG. 12 reveals that, the smaller the value of k, in other words, the smaller the magnetic reluctance $R_2$ of the respective permanent magnets 4 and 7, as compared to the magnetic reluctance $R_1$ of the permanent magnet 6, the more the magnetic reluctance $R_c$ of the entire circuit is reduced. However, if the magnetic reluctance $R_2$ of the respective permanent magnets 4 and 7 is too small, as compared to the magnetic reluctance $R_1$ of the permanent magnet 6, it can be considered that, although the generated magnetic flux and the generated attractive force by the electromagnet 20 are increased, the magnetic flux of the permanent magnet 6 will leak into the bypass magnetic path 9A, thereby the bias magnetic flux being decreased.

Figure 14:
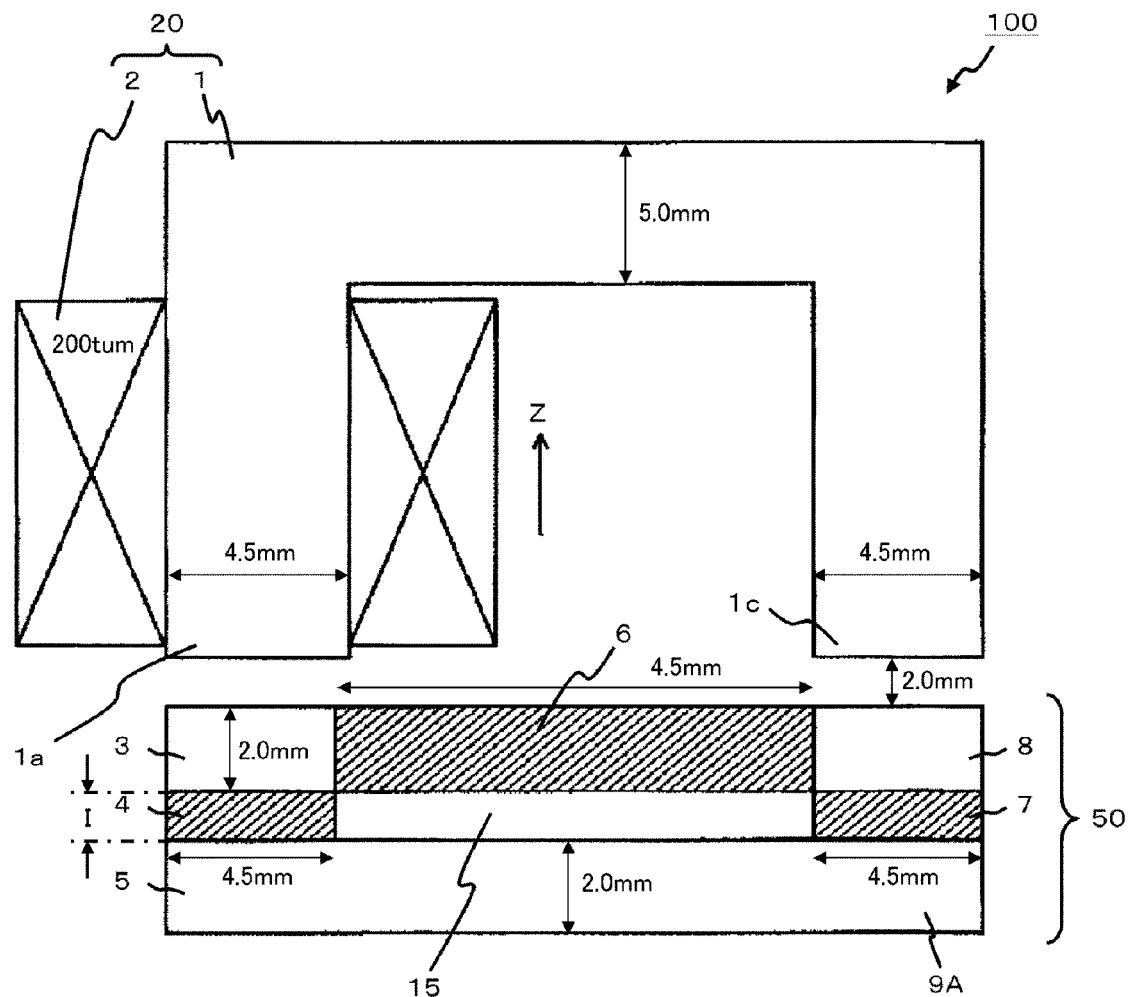
FIG. 14 is a view illustrating the geometry and dimensions of a magnetic levitation control device which was used for numerical analysis by the finite element method using the thickness of the permanent magnet in the bypass magnetic path as a parameter.

Then, for a model of hybrid type magnetic bearing in which four electromagnets 20 are disposed on a disk-shaped magnetically levitated rotor, a numerical analysis by the finite element method using the thickness I of the respective permanent magnets 4 and 7 of the bypass magnetic path 9A as a variable parameter was performed, the generated attractive force (N) and the force factor (N/A: the attractive force generated per unit current) were examined. The geometry and dimensions used for examination are as shown in FIG. 14. In addition, as the analysis conditions, the number of meshes was defined to be approx. 240,000 (exactly, 233,326), and as the permanent magnets 4, 6, and 7, a neodymium magnet (coercive force: 962 kA/m; residual magnetic flux density: 1.43T; and relative permeability: 1.18) and as the magnetic substances 3, 5, and 8, SUY-1 (JIS) were used respectively. Further, the magnetizing current for the electromagnet 20 was defined to be –1 A, 0 A, or 1 A, and for each, the thickness I of the respective permanent magnets 4 and 7 of the bypass magnetic path 9A was varied from a minimum of 0.1 mm to a maximum of 4.0 mm through intermediate values of 0.3 mm, 0.5 mm, 0.7 mm, 1.0 mm, 1.3 mm, 1.5 mm, 2.0 mm, and 3.0 mm for conducting the numerical analysis. Assuming that the magnetic reluctance is simply in inverse proportion to the cross-sectional area of the permanent magnet, and in proportion to the thickness, when the thickness I of the respective permanent magnets 4 and 7=0.1 mm, (magnetic reluctance $2R_2$ of bypass magnetic path 9A)/(magnetic reluctance $R_1$ of permanent magnet 6)≈0.02, and (combined resistance $R_c$)/(magnetic reluctance $R_1$ of permanent magnet 6)≈0.02.

Likewise, when thickness $I=0.3$ mm, $2R_2/R_1 \approx 0.06$, and $R_c/R_1 \approx 0.06$;

when thickness $I=0.5$ mm, $2R_2/R_1 \approx 0.10$, and $R_c/R_1 \approx 0.09$;

when thickness $I=0.7$ mm, $2R_2/R_1 \approx 0.14$, and $R_c/R_1 \approx 0.13$;

when thickness $I=1.0$ mm, $2R_2/R_1 \approx 0.21$, and $R_c/R_1 \approx 0.17$;

when thickness $I=1.3$ mm, $2R_2/R_1 \approx 0.27$, and $R_c/R_1 \approx 0.21$;

when thickness $I=1.5$ mm, $2R_2/R_1 \approx 0.31$, and $R_c/R_1 \approx 0.24$;

when thickness $I=2.0$ mm, $2R_2/R_1\approx0.41$, and $R_c/R_1\approx0.29$;

when thickness $I=3.0$ mm, $2R_2/R_1\approx0.62$, and $R_c/R_1\approx0.38$;

and when thickness $I=4.0$ mm, $2R_2/R_1\approx0.83$, and $R_c/R_1\approx0.45$.

Figure 15:
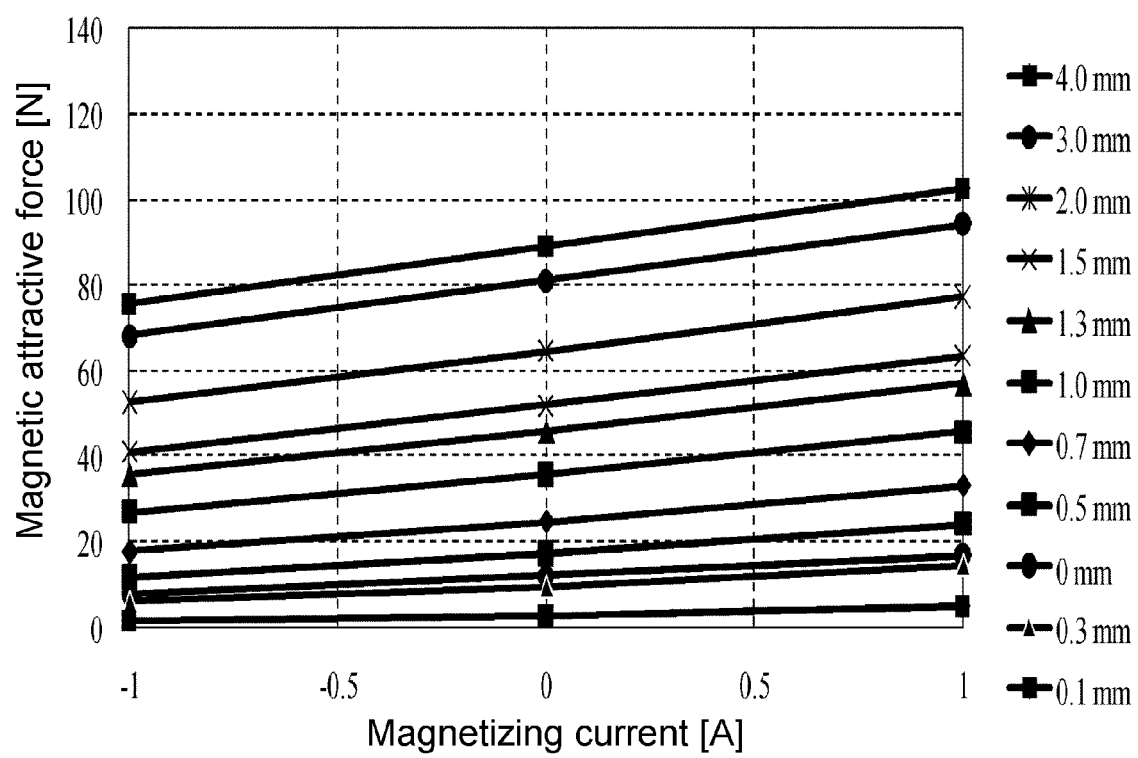
FIG. 15 is a view illustrating a result of the numerical analysis by the finite element method using the thickness of the permanent magnet in the bypass magnetic path as a parameter.
Figure 16:
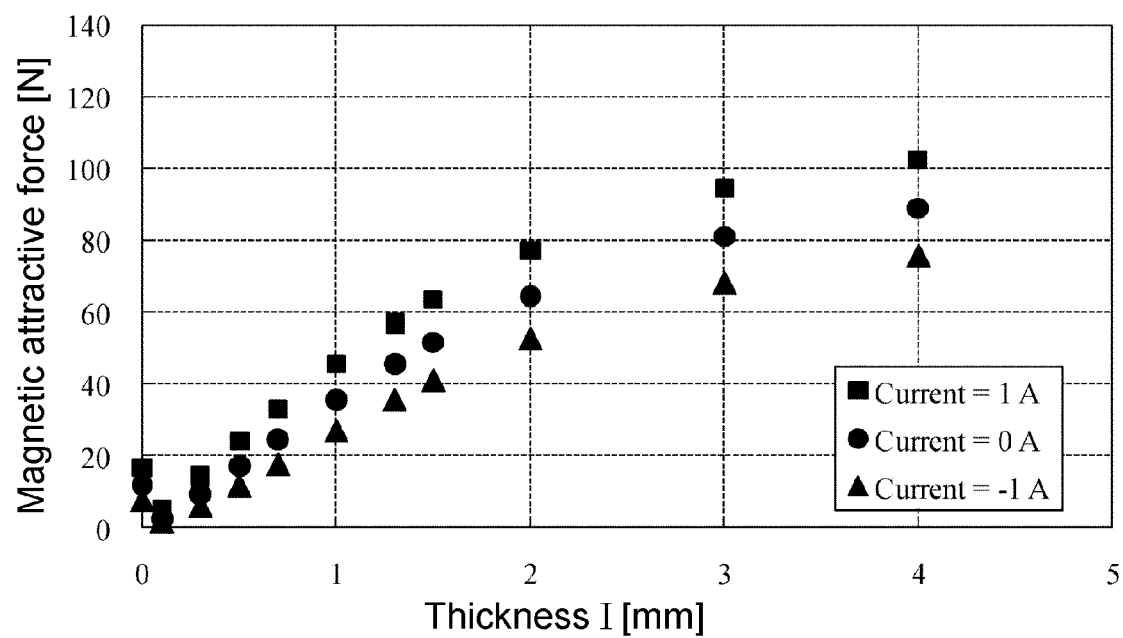
FIG. 16 is a view illustrating a result of the numerical analysis by the finite element method using the thickness of the permanent magnet in the bypass magnetic path as a parameter.

FIG. 15 is a graph illustrating the relationship between the magnetizing current for the electromagnet 20 and the force of magnetic attraction in the case where the thickness I of the respective permanent magnets 4 and 7 of the bypass magnetic path 9A is varied as a parameter, and FIG. 16 is a graph which is obtained by redrawing the graph shown in FIG. 15, taking the thickness I of the respective permanent magnets 4 and 7 of the bypass magnetic path 9A as the axis of abscissas. The result of the analysis for the thickness I of the respective permanent magnets 4 and 7 of 0 mm means that which was obtained using only the permanent magnet 6 with the bypass magnetic path 9A being omitted.

Figure 17:
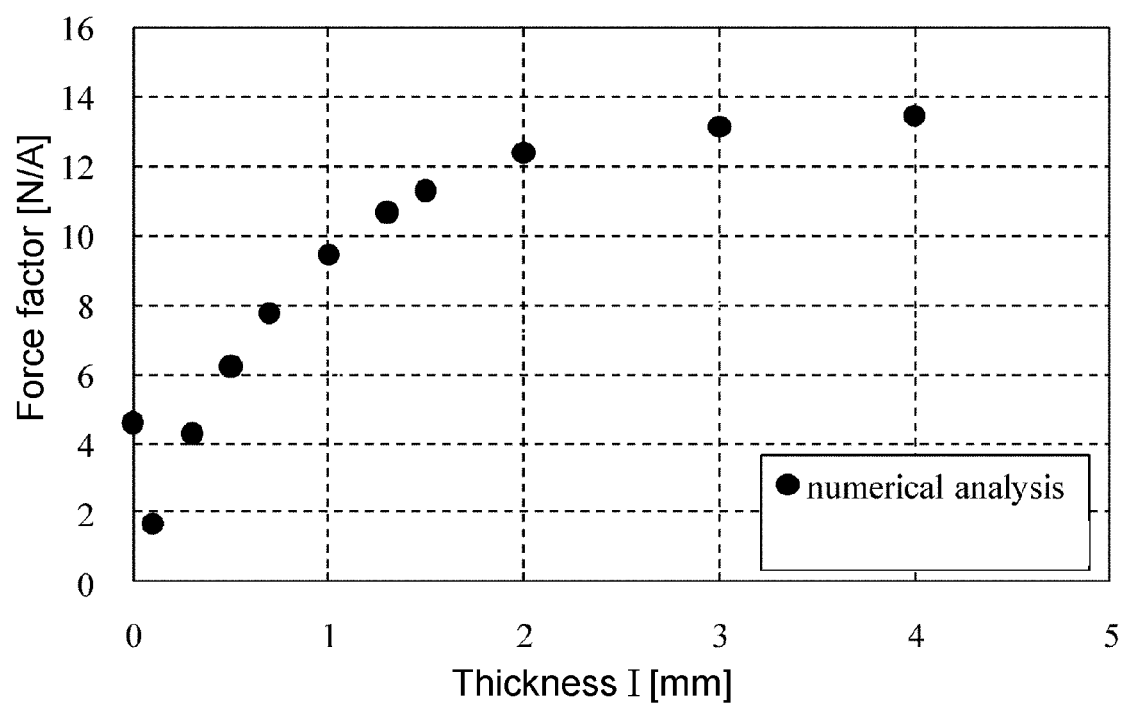
FIG. 17 is a view illustrating a result of the numerical analysis by the finite element method using the thickness of the permanent magnet in the bypass magnetic path as a parameter.
Figure 18:
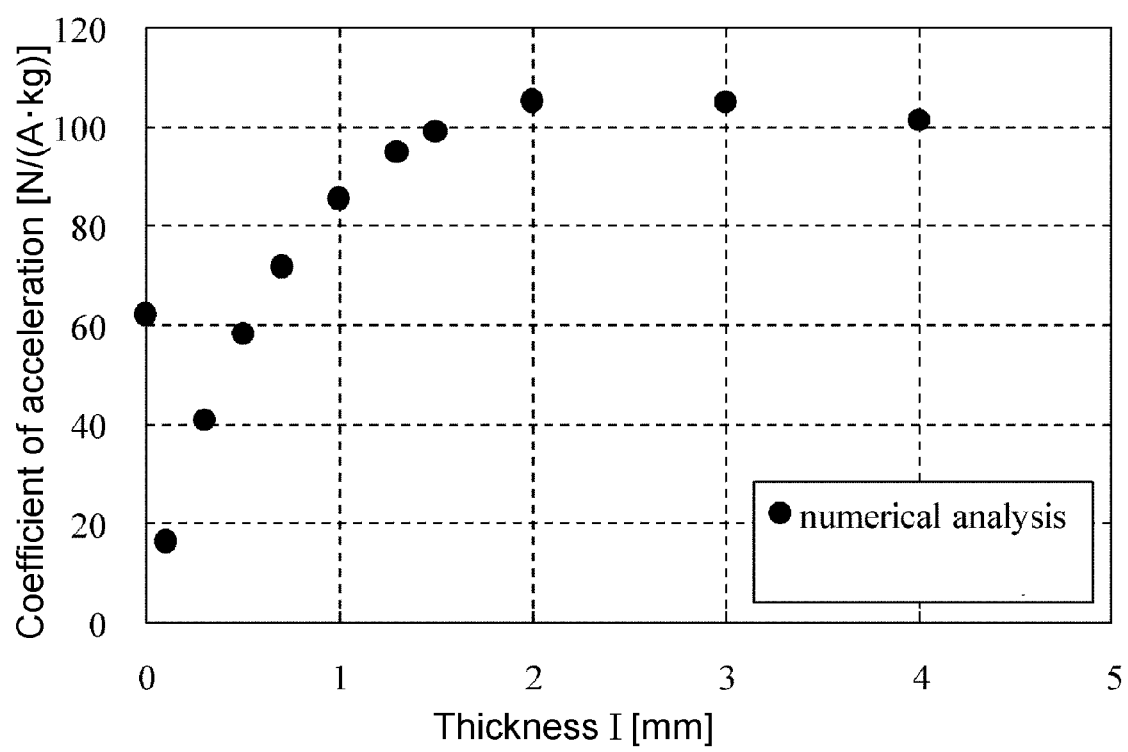
FIG. 18 is a view illustrating a result of the numerical analysis by the finite element method using the thickness of the permanent magnet in the bypass magnetic path as a parameter.

FIG. 17 is a graph illustrating the influence of the thickness I of the respective permanent magnets 4 and 7 of the bypass magnetic path 9A on the gradient of the graph in FIG. 15 (the force factor (N/A): representing the generatable force per unit current), and FIG. 18 is a graph illustrating the relationship between the coefficient of acceleration (N/(A·kg)) obtained by dividing the force factor by the mass of the object to be magnetically levitated 50 and the thickness I of the respective permanent magnets 4 and 7 of the bypass magnetic path 9A. The coefficient of acceleration represents the controllability (the dynamic characteristics) in magnetically levitating the object to be magnetically levitated 50, such as the "ability to withstand high acceleration", the "ability to be moved at high speed", and the like, and the larger the coefficient of acceleration the better the controllability will be.

Referring to FIG. 15 and FIG. 16 reveals that, when the thickness I of the respective permanent magnets 4 and 7 of the bypass magnetic path 9A is less than 0.3 mm, which gives $2R_2/R_1\approx0.06$, although the magnetic flux formed by the respective permanent magnets 4 and 7 is added, the force of magnetic attraction is weaker than that given when the thickness I=0, in other words, only the permanent magnet 6 is used with the bypass magnetic path 9A being omitted. In addition, referring to FIG. 17 reveals that, when the thickness I of the respective permanent magnets 4 and 7 of the bypass magnetic path 9A is less than 0.3 mm, which gives $2R_2/R_1\approx0.06$, the force factor (N/A) is smaller than that given when the thickness I=0, in other words, only the permanent magnet 6 is used with the by pass magnetic path 9A being omitted. Further, referring to FIG. 18 reveals that, when the thickness I of the respective permanent magnet 4 and 7 of the bypass magnetic path 9A is less than 0.5 mm, which gives $2R_2/R_1\approx0.10$, the coefficient of acceleration (N/(A·kg)) is smaller than that given when the thickness I=0, in other words, only the permanent magnet 6 is used with the by pass magnetic path 9A being omitted. These phenomena can be considered to be attributable to that the magnetic reluctance $2R_2$ of the bypass magnetic path 9A is too small, as compared to the magnetic reluctance $R_1$ of the permanent magnet 6, thereby a large portion of the magnetic flux of the permanent magnet 6 being leaked to the bypass magnetic path 9A, and it is found that the magnetic reluctance $2R_2$ of the bypass magnetic path 9A is preferably more than 0.14 times larger than $R_1$, referring to $2R_2/R_1\approx0.14$, which is given when the thickness I of the respective permanent magnets 4 and 7=0.7 mm.

In addition, by referring to FIG. 16, it is found that, by increasing the thickness I of the respective permanent magnets 4 and 7, the force of magnetic attraction is increased, gradually approaching 100 N or so in the present Example. This asymptotic effect can be considered to be due to the magnetic reluctance reduction effect resulting from providing the bypass magnetic path 9A. Although, by increasing the thickness I of the respective permanent magnets 4 and 7, the force of magnetic attraction is increased several times, as compared to that given when the thickness I=0, in other words, only the permanent magnet 6 is used with the bypass magnetic path 9A being omitted, this phenomenon can be considered to be attributable to the increase in bias magnetic flux due to the secondary permanent magnet rather than the magnetic reluctance reduction effect.

Further, by referring to FIG. 17, it is found that, by increasing the thickness I of the respective permanent magnets 4 and 7, the force factor is increased, gradually approaching 14 N/A in the present Example. This asymptotic effect can also be considered to be due to the magnetic reluctance reduction effect resulting from providing the bypass magnetic path 9A.

Further, by referring to FIG. 18, it is found that, by increasing the thickness I of the respective permanent magnets 4 and 7, the mass of the object to be magnetically levitated 50 is increased, thereby the coefficient of acceleration reaching a maximum value when the thickness I of the respective permanent magnets 4 and 7=2 mm.

The aforementioned results indicate that, by providing the bypass magnetic path 9A having a magnetic reluctance $2R_2$ more than 0.14 times larger than the magnetic reluctance of the permanent magnet 6 in parallel with the permanent magnet 6, the force of magnetic attraction, the force factor, and the coefficient of acceleration are improved, as compared to those given when only the permanent magnet 6 is used. In addition, for the control performance, in other words, the coefficient of acceleration, the thickness I of the respective permanent magnets 4 and 7 has an optimum value which depends upon the mass of the object to be magnetically levitated 50 (in this example, thickness I=2 mm).

DESCRIPTION OF SYMBOLS 1, 31, 41: Electromagnet core
1a, 1c: Salient pole
1b: Connection part
2, 32, 42: Electromagnet coil
3: Magnetic substance
4: Permanent magnet
5: Magnetic substance
6: Permanent magnet
7: Permanent magnet
8: Magnetic substance
9: Control magnetic flux
9A: Bypass magnetic path
10: Bias magnetic flux
15: Space or non-magnetic substance part
20: Electromagnet
30: Radial direction electromagnet
40: Axial direction electromagnet
50: Object to be magnetically levitated
51: Non-magnetic substance
100: Magnetic levitation control device
200, 300, 400, 500: Hybrid type magnetic bearing

The invention claimed is:
1. A magnetic levitation control device for controlling the position of an object to be magnetically levitated with respect to an electromagnet by means of a bias magnetic flux formed by a biasing permanent magnet and a control magnetic flux formed by an electromagnet with two magnetic poles facing the object to be magnetically levitated closely, wherein the biasing permanent magnet is set between two places facing the two magnetic poles of the electromagnet in the object to be magnetically levitated, so that direction of the bias magnetic flux and direction of the control magnetic flux are same in the electromagnet, and a bypass magnetic path, in which a part of the control magnetic flux passes through a path separate from the biasing permanent magnet, is formed in a farther side of the object to be magnetically levitated from the electromagnet than the biasing permanent magnet, and at least one permanent magnet, forming a magnetic flux in the by pass magnetic path having the same direction as the control magnetic flux passing through the bypass magnetic path, is set in a farther side of the object to be magnetically levitated from the electromagnet than the biasing permanent magnet, so that passage of the bias magnetic flux in the bypass magnetic path is blocked.

2. The magnetic levitation control device according to claim 1, wherein, two permanent magnets in the bypass magnetic path are provided, facing the two magnetic poles of the electromagnet, respectively, and the magnetic force of the two permanent magnets is set such that the magnetic flux densities in the respective gaps between the respective two magnetic poles of the electromagnet and the object to be magnetically levitated are equal to each other.

3. A hybrid type magnetic bearing for controlling the position of a magnetically levitated rotor with respect to an electromagnet by means of a bias magnetic flux formed by a biasing permanent magnet and a control magnetic flux formed by an electromagnet with two magnetic poles facing the object to be magnetically levitated closely, wherein the biasing permanent magnet is set between two places facing the two magnetic poles of the electromagnet in the magnetically levitated rotor, so that direction of the bias magnetic flux and direction of the control magnetic flux are same in the electromagnet, and a bypass magnetic path, in which a part of the control magnetic flux passes through a path separated from the biasing permanent magnet, is formed in a father side of the magnetically levitated rotor from the electromagnet than the biasing permanent magnet, and at least one permanent magnet, forming a magnetic flux in the bypass magnetic path having the same direction as the control magnetic flux passing through the bypass magnetic path, is set in a farther side of the magnetically levitated rotor from the electromagnet than the biasing permanent magnet, so that passage of the bias magnetic flux in the bypass magnetic path is blocked, wherein the biasing permanent magnet which is concentrically disposed, being magnetized in the radial direction, and the bypass magnetic path connecting between the respective magnetic poles of the biasing permanent magnet are provided in the magnetically levitated rotor, and the two magnetic poles of the electromagnet face the magnetically levitated rotor from the axial direction, and the electromagnet controls the axial position of the magnetically levitated rotor.

4. The hybrid type magnetic bearing according to claim 3, wherein, as the permanent magnet of the bypass magnetic path, a permanent magnet is provided which is concentrically disposed, being magnetized in the axial direction of the magnetically levitated rotor.

5. The hybrid type magnetic bearing according to claim 4, wherein, the two permanent magnets in the bypass magnetic path are provided, facing the two magnetic poles of the electromagnet, respectively, and the magnetic force of the two permanent magnets is set such that the magnetic flux densities in the respective gaps between the respective two magnetic poles of the electromagnet and the object to be magnetically levitated are equal to each other.

6. A hybrid type magnetic bearing for controlling the position of a magnetically levitated rotor with respect to an electromagnet by means of a bias magnetic flux formed by a biasing permanent magnet and a control magnetic flux formed by an electromagnet with two magnetic poles facing the object to be magnetically levitated closely, wherein the biasing permanent magnet is set between two places facing the two magnetic poles of the electromagnet in the magnetically levitated rotor, so that direction of the bias magnetic flux and direction of the control magnetic flux are same in the electromagnet, and a bypass magnetic path, in which a part of the control magnetic flux passes through a path separated from the biasing permanent magnet, is formed in a farther side of the magnetically levitated rotor from the electromagnet than the biasing permanent magnet, and at least one permanent magnet, forming a magnetic flux in the bypass magnetic path having the same direction as the control magnetic flux passing through the bypass magnetic path, is set in a farther side of the magnetically levitated rotor from the electromagnet than the biasing permanent magnet, so that passage of the bias magnetic flux in the bypass magnetic path is blocked, wherein the biasing permanent magnet, being cylinder-shaped and magnetized in the axial direction, and the bypass magnetic path connecting between the respective magnetic poles of the biasing permanent magnet are provided in the magnetically levitated rotor, and the electromagnet is disposed such that the two magnetic poles of the electromagnet face the magnetically levitated rotor from a radial direction, the electromagnet controlling the position of the magnetically levitated rotor in the radial direction.

* * * * *